(12) United States Patent
Venkataraman et al.

(10) Patent No.: US 9,214,013 B2
(45) Date of Patent: Dec. 15, 2015

(54) SYSTEMS AND METHODS FOR CORRECTING USER IDENTIFIED ARTIFACTS IN LIGHT FIELD IMAGES

(71) Applicant: Pelican Imaging Corporation, Mountain View, CA (US)

(72) Inventors: Kartik Venkataraman, San Jose, CA (US); Florian Ciurea, San Jose, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 130 days.

(21) Appl. No.: 14/028,278

(22) Filed: Sep. 16, 2013

(65) Prior Publication Data
US 2014/0079336 A1 Mar. 20, 2014

Related U.S. Application Data

(60) Provisional application No. 61/701,044, filed on Sep. 14, 2012.

(51) Int. Cl.
*G06K 9/40* (2006.01)
*G06T 5/00* (2006.01)

(52) U.S. Cl.
CPC .............. *G06T 5/002* (2013.01); *G06T 5/005* (2013.01); *G06T 2200/04* (2013.01); *G06T 2207/10028* (2013.01); *G06T 2207/10052* (2013.01); *G06T 2207/20104* (2013.01)

(58) Field of Classification Search
CPC ..... G06T 5/002; G06T 5/005; G06T 2200/04; G06T 2207/10052; G06T 2207/20104; G06T 2207/10028
USPC .................................. 382/254, 274–275, 312
See application file for complete search history.

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 1839394 A 9/2006
EP 840502 A2 5/1998
(Continued)

OTHER PUBLICATIONS

International Search Report and Written Opinion for International Application No. PCT/US13/59991, International Filing Date Sep. 16, 2013, Search Completed Feb. 6, 2014, Mailed Feb. 26, 2014, 8 pgs.
(Continued)

*Primary Examiner* — Kanjibhai Patel
(74) *Attorney, Agent, or Firm* — KPPB LLP

(57) ABSTRACT

Systems and methods for correction of user identified artifacts in light field images are disclosed. One embodiment of the invention is a method for correcting artifacts in a light field image rendered from a light field obtained by capturing a set of images from different viewpoints and initial depth estimates for pixels within the light field using a processor configured by an image processing application, where the method includes: receiving a user input indicating the location of an artifact within said light field image; selecting a region of the light field image containing the indicated artifact; generating updated depth estimates for pixels within the selected region; and re-rendering at least a portion of the light field image using the updated depth estimates for the pixels within the selected region.

28 Claims, 14 Drawing Sheets

(56) References Cited

U.S. PATENT DOCUMENTS

| | | | |
|---|---|---|---|
| 4,323,925 | A | 4/1982 | Abell et al. |
| 4,460,449 | A | 7/1984 | Montalbano |
| 4,467,365 | A | 8/1984 | Murayama et al. |
| 5,005,083 | A | 4/1991 | Grage et al. |
| 5,070,414 | A | 12/1991 | Tsutsumi |
| 5,144,448 | A | 9/1992 | Hornbaker |
| 5,327,125 | A | 7/1994 | Iwase et al. |
| 5,629,524 | A | 5/1997 | Stettner et al. |
| 5,808,350 | A | 9/1998 | Jack et al. |
| 5,832,312 | A | 11/1998 | Rieger et al. |
| 5,880,691 | A | 3/1999 | Fossum et al. |
| 5,933,190 | A | 8/1999 | Dierickx et al. |
| 5,973,844 | A | 10/1999 | Burger |
| 6,002,743 | A | 12/1999 | Telymonde |
| 6,005,607 | A | 12/1999 | Uomori et al. |
| 6,034,690 | A | 3/2000 | Gallery et al. |
| 6,069,351 | A | 5/2000 | Mack |
| 6,069,365 | A | 5/2000 | Chow et al. |
| 6,097,394 | A | 8/2000 | Levoy et al. |
| 6,124,974 | A | 9/2000 | Burger |
| 6,137,535 | A | 10/2000 | Meyers |
| 6,141,048 | A | 10/2000 | Meyers |
| 6,160,909 | A | 12/2000 | Melen |
| 6,163,414 | A | 12/2000 | Kikuchi et al. |
| 6,172,352 | B1 | 1/2001 | Liu |
| 6,175,379 | B1 | 1/2001 | Uomori et al. |
| 6,205,241 | B1 | 3/2001 | Melen |
| 6,239,909 | B1 | 5/2001 | Hayashi et al. |
| 6,358,862 | B1 | 3/2002 | Ireland et al. |
| 6,476,805 | B1 * | 11/2002 | Shum et al. .................. 345/420 |
| 6,477,260 | B1 | 11/2002 | Shimomura |
| 6,502,097 | B1 | 12/2002 | Chan et al. |
| 6,525,302 | B2 | 2/2003 | Dowski, Jr. et al. |
| 6,563,537 | B1 | 5/2003 | Kawamura et al. |
| 6,571,466 | B1 | 6/2003 | Glenn et al. |
| 6,603,513 | B1 | 8/2003 | Berezin |
| 6,611,289 | B1 | 8/2003 | Yu et al. |
| 6,627,896 | B1 | 9/2003 | Hashimoto et al. |
| 6,628,330 | B1 | 9/2003 | Lin |
| 6,635,941 | B2 | 10/2003 | Suda |
| 6,639,596 | B1 | 10/2003 | Shum et al. |
| 6,657,218 | B2 | 12/2003 | Noda |
| 6,671,399 | B1 | 12/2003 | Berestov |
| 6,750,904 | B1 | 6/2004 | Lambert |
| 6,765,617 | B1 | 7/2004 | Tangen et al. |
| 6,771,833 | B1 | 8/2004 | Edgar |
| 6,774,941 | B1 | 8/2004 | Boisvert et al. |
| 6,795,253 | B2 | 9/2004 | Shinohara |
| 6,819,358 | B1 | 11/2004 | Kagle et al. |
| 6,879,735 | B1 | 4/2005 | Portniaguine et al. |
| 6,903,770 | B1 | 6/2005 | Kobayashi et al. |
| 6,909,121 | B2 | 6/2005 | Nishikawa |
| 6,958,862 | B1 | 10/2005 | Joseph |
| 7,015,954 | B1 | 3/2006 | Foote et al. |
| 7,085,409 | B2 | 8/2006 | Sawhney et al. |
| 7,161,614 | B1 | 1/2007 | Yamashita et al. |
| 7,199,348 | B2 | 4/2007 | Olsen et al. |
| 7,235,785 | B2 | 6/2007 | Hornback et al. |
| 7,262,799 | B2 | 8/2007 | Suda |
| 7,292,735 | B2 | 11/2007 | Blake et al. |
| 7,295,697 | B1 | 11/2007 | Satoh |
| 7,369,165 | B2 | 5/2008 | Bosco et al. |
| 7,391,572 | B2 | 6/2008 | Jacobowitz et al. |
| 7,408,725 | B2 | 8/2008 | Sato |
| 7,606,484 | B1 | 10/2009 | Richards et al. |
| 7,633,511 | B2 | 12/2009 | Shum et al. |
| 7,639,435 | B2 | 12/2009 | Chiang |
| 7,646,549 | B2 | 1/2010 | Zalevsky et al. |
| 7,657,090 | B2 | 2/2010 | Omatsu et al. |
| 7,675,080 | B2 | 3/2010 | Boettiger |
| 7,675,681 | B2 | 3/2010 | Tomikawa et al. |
| 7,706,634 | B2 | 4/2010 | Schmitt et al. |
| 7,723,662 | B2 | 5/2010 | Levoy et al. |
| 7,782,364 | B2 | 8/2010 | Smith |
| 7,826,153 | B2 | 11/2010 | Hong |
| 7,840,067 | B2 | 11/2010 | Shen et al. |
| 7,912,673 | B2 | 3/2011 | Hébert et al. |
| 7,973,834 | B2 | 7/2011 | Yang |
| 7,986,018 | B2 | 7/2011 | Rennie |
| 7,990,447 | B2 | 8/2011 | Honda et al. |
| 8,000,498 | B2 | 8/2011 | Shih et al. |
| 8,013,904 | B2 | 9/2011 | Tan et al. |
| 8,027,531 | B2 | 9/2011 | Wilburn et al. |
| 8,044,994 | B2 | 10/2011 | Vetro et al. |
| 8,077,245 | B2 | 12/2011 | Adamo et al. |
| 8,098,297 | B2 | 1/2012 | Crisan et al. |
| 8,098,304 | B2 | 1/2012 | Pinto et al. |
| 8,106,949 | B2 | 1/2012 | Tan et al. |
| 8,126,279 | B2 | 2/2012 | Marcellin et al. |
| 8,130,120 | B2 | 3/2012 | Kawabata et al. |
| 8,131,097 | B2 | 3/2012 | Lelescu et al. |
| 8,164,629 | B1 | 4/2012 | Zhang |
| 8,169,486 | B2 | 5/2012 | Corcoran et al. |
| 8,180,145 | B2 | 5/2012 | Wu et al. |
| 8,189,065 | B2 * | 5/2012 | Georgiev et al. ........... 348/222.1 |
| 8,189,089 | B1 | 5/2012 | Georgiev |
| 8,212,914 | B2 | 7/2012 | Chiu |
| 8,213,711 | B2 | 7/2012 | Tam |
| 8,231,814 | B2 | 7/2012 | Duparre |
| 8,242,426 | B2 | 8/2012 | Ward et al. |
| 8,244,027 | B2 | 8/2012 | Takahashi |
| 8,244,058 | B1 * | 8/2012 | Intwala et al. ................ 382/275 |
| 8,254,668 | B2 | 8/2012 | Mashitani et al. |
| 8,279,325 | B2 | 10/2012 | Pitts et al. |
| 8,280,194 | B2 | 10/2012 | Wong et al. |
| 8,289,409 | B2 | 10/2012 | Chang |
| 8,290,358 | B1 * | 10/2012 | Georgiev ...................... 396/326 |
| 8,294,099 | B2 | 10/2012 | Blackwell, Jr. |
| 8,305,456 | B1 | 11/2012 | McMahon |
| 8,315,476 | B1 * | 11/2012 | Georgiev et al. .............. 382/276 |
| 8,345,144 | B1 | 1/2013 | Georgiev et al. |
| 8,360,574 | B2 | 1/2013 | Ishak et al. |
| 8,400,555 | B1 | 3/2013 | Georgiev et al. |
| 8,406,562 | B2 | 3/2013 | Bassi et al. |
| 8,446,492 | B2 | 5/2013 | Nakano et al. |
| 8,514,491 | B2 | 8/2013 | Duparre |
| 8,541,730 | B2 | 9/2013 | Inuiya |
| 8,542,933 | B2 | 9/2013 | Venkataraman et al. |
| 8,553,093 | B2 | 10/2013 | Wong et al. |
| 8,559,756 | B2 | 10/2013 | Georgiev et al. |
| 8,581,995 | B2 | 11/2013 | Lin et al. |
| 8,619,082 | B1 | 12/2013 | Ciurea et al. |
| 8,648,918 | B2 | 2/2014 | Kauker et al. |
| 8,655,052 | B2 | 2/2014 | Spooner et al. |
| 8,682,107 | B2 | 3/2014 | Yoon et al. |
| 8,692,893 | B2 | 4/2014 | McMahon |
| 8,773,536 | B1 | 7/2014 | Zhang |
| 8,780,113 | B1 | 7/2014 | Ciurea et al. |
| 8,804,255 | B2 | 8/2014 | Duparre |
| 8,830,375 | B2 | 9/2014 | Ludwig |
| 8,831,367 | B2 | 9/2014 | Venkataraman et al. |
| 8,854,462 | B2 | 10/2014 | Herbin et al. |
| 8,861,089 | B2 | 10/2014 | Duparre |
| 8,866,912 | B2 | 10/2014 | Mullis |
| 8,866,920 | B2 | 10/2014 | Venkataraman et al. |
| 8,866,951 | B2 | 10/2014 | Keelan |
| 8,878,950 | B2 | 11/2014 | Lelescu et al. |
| 8,885,059 | B1 | 11/2014 | Venkataraman et al. |
| 8,896,594 | B2 | 11/2014 | Xiong et al. |
| 8,896,719 | B1 | 11/2014 | Venkataraman et al. |
| 8,902,321 | B2 | 12/2014 | Venkataraman et al. |
| 8,928,793 | B2 | 1/2015 | McMahon |
| 9,019,426 | B2 | 4/2015 | Han et al. |
| 9,025,894 | B2 | 5/2015 | Venkataraman et al. |
| 9,025,895 | B2 | 5/2015 | Venkataraman et al. |
| 9,031,335 | B2 | 5/2015 | Venkataraman et al. |
| 9,031,342 | B2 | 5/2015 | Venkataraman et al. |
| 9,031,343 | B2 | 5/2015 | Venkataraman et al. |
| 9,036,928 | B2 | 5/2015 | Venkataraman et al. |
| 9,036,931 | B2 | 5/2015 | Venkataraman et al. |
| 9,041,823 | B2 | 5/2015 | Venkataraman et al. |
| 9,041,824 | B2 | 5/2015 | Lelescu et al. |
| 9,041,829 | B2 | 5/2015 | Venkataraman et al. |
| 9,042,667 | B2 | 5/2015 | Venkataraman et al. |

(56) References Cited

U.S. PATENT DOCUMENTS

| | | |
|---|---|---|
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0027608 A1 | 3/2002 | Johnson |
| 2002/0039438 A1 | 4/2002 | Mori et al. |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0009313 A1 | 1/2005 | Suzuki et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler et al. |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0112635 A1 | 5/2008 | Kondo et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |

(56) References Cited

U.S. PATENT DOCUMENTS

| | | |
|---|---|---|
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0140131 A1 | 6/2009 | Utagawa et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0177411 A1 | 7/2010 | Hegde et al. |
| 2010/0194901 A1 | 8/2010 | Van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2010/0321595 A1 | 12/2010 | Chiu |
| 2011/0001037 A1 | 1/2011 | Tewinkle |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic |
| 2011/0255592 A1 | 10/2011 | Sung et al. |
| 2011/0255745 A1 | 10/2011 | Hodder et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim, II et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côtè et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0229628 A1 | 9/2012 | Ishiyama et al. |
| 2012/0249550 A1 | 10/2012 | Akeley et al. |
| 2012/0249836 A1 | 10/2012 | Ali et al. |
| 2012/0262607 A1 | 10/2012 | Shimura et al. |
| 2012/0287291 A1 | 11/2012 | McMahon |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee et al. |
| 2013/0076967 A1 | 3/2013 | Brunner et al. |
| 2013/0077880 A1 | 3/2013 | Venkataraman et al. |

(56) References Cited

U.S. PATENT DOCUMENTS

| | | |
|---|---|---|
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0009586 A1 | 1/2014 | McNamer et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0091900 A1 | 4/2015 | Yang et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |

FOREIGN PATENT DOCUMENTS

| | | |
|---|---|---|
| EP | 1201407 A2 | 5/2002 |
| EP | 1734766 A2 | 12/2006 |
| EP | 2104334 A1 | 9/2009 |
| EP | 2336816 A2 | 6/2011 |
| JP | 59-025483 | 9/1984 |
| JP | 64-037177 | 7/1989 |
| JP | 02-285772 A | 11/1990 |
| JP | 11142609 A | 5/1999 |
| JP | 11223708 A | 8/1999 |
| JP | 2000209503 A | 7/2000 |
| JP | 2002205310 A | 7/2002 |
| JP | 2002252338 A | 9/2002 |
| JP | 2003094445 A | 4/2003 |
| JP | 2003163938 A | 6/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2008055908 A | 3/2008 |
| JP | 2008507874 A | 3/2008 |
| JP | 2008258885 A | 10/2008 |
| JP | 2009132010 A | 6/2009 |
| JP | 2011109484 A | 6/2011 |
| JP | 2013526801 A | 6/2013 |
| JP | 2014521117 A | 8/2014 |
| KR | 1020110097647 A | 8/2011 |
| WO | 2007083579 A1 | 7/2007 |
| WO | 2008108271 A1 | 9/2008 |
| WO | 2008108926 A1 | 9/2008 |
| WO | 2008150817 A1 | 12/2008 |
| WO | 2009151903 A2 | 12/2009 |
| WO | 2011008443 A2 | 1/2011 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |

(56) References Cited

FOREIGN PATENT DOCUMENTS

| WO | 2014150856 A1 | 9/2014 |
|---|---|---|
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |

OTHER PUBLICATIONS

Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
LensVector, "How LensVector Autofocus Works", http://www.lensvector.com/overview.html.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Muehlebach, "Camera Auto Exposure Control for VSLAM Applications", Studies on Mechatronics.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (September), 93-100.
Vaish et al., "Reconstructing Occluded Surfaces Using Synthetic Apertures: Stereo, Focus and Robust Measures", Proceeding, CVPR'06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Vuong et al., "A New Auto Exposure and Auto White-Balance Algorithm to Detect High Dynamic Range Conditions Using CMOS Technology".
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Liu et al., "Virtual View Reconstruction Using Temporal Information", 2012 IEEE International Conference on Multimedia and Expo, 2012, pp. 115-120.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE—IS&T Electronic Imaging, vol. 7246, pp. 72460X-1-72460X-9.

(56) References Cited

OTHER PUBLICATIONS

Bruckner et al., "Artificial compound eye applying hyperacuity", Optics Express, December 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643 &rep=rep1 &type=pdf>, Title pg., abstract, table of contents, pp. 1-263 (269 total pages), 2001.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim. Syst. Sign Process, 2007, vol. 18, pp. 83-101.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., Fast and Robust Multiframe Super Resolution, IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer et al., Optical System Design, 2nd Edition, SPIE Press, pp. 49-58.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application PCT/US13/069932, Search Completed Mar. 14, 2014, Mailed Apr. 14, 2014, 12 pgs.
IPRP for International Application No. PCT/US2012/059813, International Filing Date Oct. 11, 2012, Search Completed Apr. 15, 2014, 7 pgs.
Search Report and Written Opinion for International Application PCT/US11/36349, mailed Aug. 22, 2011, 12 pgs.

(56) References Cited

OTHER PUBLICATIONS

International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200, 2011.
Bishop et al., "Light Field Superresolution", Retrieved from http://home.eps.hw.ac.uk/~sz73/ICCP09/LightFieldSuperresolution.pdf, 9 pp. 9.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998, 3459, 9 pgs.
Borman et al., "Simultaneous Multi-Frame Map Super-Resolution Video Enhancement Using Spatio-Temporal Priors", Image Processing, 1999, ICIP 99 Proceedings, vol. 3, pp. 469-473.
US 8,957,977, 2/2015, Venkataraman et al. (withdrawn).
US 8,964,053, 2/2015, Venkataraman et al. (withdrawn).
US 8,965,058, 2/2015, Venkataraman et al. (withdrawn).
US 9,014,491, 4/2015, Venkataraman et al. (withdrawn).
International Search Report and Written Opinion for International Application PCT/US2014/064693, Completed Mar. 7, 2015, Mailed Apr. 2, 2015, 15 pgs.
Extended European Search Report for European Application EP12835041.0, Report Completed Jan. 28, 2015, Mailed Feb. 4, 2015, 6 Pgs.
International Preliminary Report on Patentability for International Application No. PCT/US2013/059991, Issued Mar. 17, 2015, Mailed Mar. 26, 2015, 8 pgs.
International Preliminary Report on Patentability for International Application PCT/US13/62720, Report Issued Mar. 31, 2015, Mailed Apr. 9, 2015, 8 Pgs.
International Preliminary Report on Patentability for International Application PCT/US2013/039155, completed Nov. 4, 2014, Mailed Nov. 13, 2014, 10 Pgs.
International Preliminary Report on Patentability for International Application PCT/US2013/048772, issued Dec. 31, 2014, Mailed Jan. 8, 2015, 8 Pgs.
International Preliminary Report on Patentability for International Application PCT/US2014/023762, issued Mar. 2, 2015, Mailed Mar. 9, 2015, 10 Pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US2013/039155, completed Jul. 1, 2013, Mailed Jul. 11, 2013, 11 Pgs.
International Search Report and Written Opinion for International Application PCT/US13/62720, completed Mar. 25, 2014, Mailed Apr. 21, 2014, 9 Pgs.
International Search Report and Written Opinion for International Application PCT/US14/17766, report completed May 28, 2014, Mailed Jun. 18, 2014, 9 Pgs.
International Search Report and Written Opinion for International Application PCT/US14/18084, completed May 23, 2014, Mailed Jun. 10, 2014, 12 pgs.
International Search Report and Written Opinion for International Application PCT/US14/18116, completed May 13, 2014, Mailed Jun. 2, 2014, 12 Pgs.
International Search Report and Written Opinion for International Application PCT/US14/22118, report completed Jun. 9, 2014, Mailed, Jun. 25, 2014, 5 pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014 5 Pgs.
International Search Report and Written Opinion for International Application PCT/US2014/022123, completed Jun. 9, 2014, Mailed Jun. 25, 2014, 5 pgs.
International Search Report and Written Opinion for International Application PCT/US2014/030692, completed Jul. 28, 2014, Mailed Aug. 27, 2014, 7 Pages.
International Search Report and Written Opinion for International Application PCT/US2014/066229, Completed Mar. 6, 2015, Mailed Mar. 19, 2015, 9 Pgs.
International Search Report and Written Opinion for International Application PCT/US2014/23762, Completed May 30, 2014, Mailed Jul. 3, 2014, 6 Pgs.
International Preliminary Report on Patentability for International Application PCT/US13/56065, Issued Feb. 24, 2015, Mailed Mar. 5, 2015, 4 Pgs.
International Preliminary Report on Patentability for International Application PCT/US2013/056502, Issued Feb. 24, 2015, Mailed Mar. 5, 2015, 7 Pgs.
Chen et al., "Interactive deformation of light fields", In Proceedings of SIGGRAPH I3D 2005, pp. 139-146.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hasinoff et al., "Search-and-Replace Editing for Personal Photo Collections", Computational Photography (ICCP) 2010, pp. 1-8.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.

(56) References Cited

OTHER PUBLICATIONS

Jarabo et al., "Efficient Propagation of Light Field Edits", In Proceedings of SIACG 2011, pp. 75-80.
Josh et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Lo et al., "Stereoscopic 3D Copy & Paste", ACM Transactions on Graphics, vol. 29, No. 6, Article 147, Dec. 2010, pp. 147:1-147:10.
Seitz et al., "Plenoptic Image Editing", International Journal of Computer Vision 48, 2, pp. 115-129.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.

\* cited by examiner

|     |     |     |     |
|-----|-----|-----|-----|
| $R_1$ | $G_4$ | $B_3$ | $G_8$ |
| $G_2$ | $R_3$ | $G_6$ | $R_4$ |
| $B_1$ | $G_3$ | $B_2$ | $G_7$ |
| $G_1$ | $R_2$ | $G_5$ | $B_4$ |

SYSTEMS AND METHODS FOR CORRECTING USER IDENTIFIED ARTIFACTS IN LIGHT FIELD IMAGES

CROSS-REFERENCE TO RELATED APPLICATIONS

This application claims the benefit under 35 C. §119(e) of Provisional Patent Application No. 61/701,044, entitled "Method and Apparatus for Selection, Detection, and Correction of Depth Related Artifacts in Light Field Images" filed on Sep. 14, 2012, the disclosure of which is hereby incorporated by reference in its entirety.

FIELD OF THE INVENTION

The present invention generally relates to the manipulation of images and more specifically the manipulation of light field images.

BACKGROUND

Binocular viewing of a scene creates two slightly different images of the scene due to the different fields of view of each eye. These differences, referred to as binocular disparity (or parallax), provide information that can be used to calculate depth in the visual scene, providing a major means of depth perception. The impression of depth associated with stereoscopic depth perception can also be obtained under other conditions, such as when an observer views a scene with only one eye while moving. The observed parallax can be utilized to obtain depth information for objects in the scene. Similar principles in machine vision can be used to gather depth information.

Two or more cameras separated by a distance can take pictures of the same scene and the captured images can be compared by shifting the pixels of two or more images to find parts of the images that match. The amount an object shifts between different camera views is called the disparity, which is inversely proportional to the distance to the object. A disparity search that detects the shift of an object in multiple images can be used to calculate the distance to the object based upon the baseline distance between the cameras and the focal length of the cameras involved. The approach of using two or more cameras to generate stereoscopic three-dimensional images is commonly referred to as multi-view stereo.

Multi-view stereo can generally be described in terms of the following components: matching criterion, aggregation method, and winner selection. The matching criterion is used as a means of measuring the similarity of pixels or regions across different images. A typical error measure is the RGB or intensity difference between images (these differences can be squared, or robust measures can be used). Some methods compute subpixel disparities by computing the analytic minimum of the local error surface or use gradient-based techniques. One method involves taking the minimum difference between a pixel in one image and the interpolated intensity function in the other image. The aggregation method refers to the manner in which the error function over the search space is computed or accumulated. The most direct way is to apply search windows of a fixed size over a prescribed disparity space for multiple cameras. Others use adaptive windows, shiftable windows, or multiple masks. Another set of methods accumulates votes in 3D space, e.g., a space sweep approach and voxel coloring and its variants. Once the initial or aggregated matching costs have been computed, a decision is made as to the correct disparity assignment for each pixel. Local methods do this at each pixel independently, typically by picking the disparity with the minimum aggregated value. Cooperative/competitive algorithms can be used to iteratively decide on the best assignments. Dynamic programming can be used for computing depths associated with edge features or general intensity similarity matches. These approaches can take advantage of one-dimensional ordering constraints along the epipolar line to handle depth discontinuities and unmatched regions. Yet another class of methods formulate stereo matching as a global optimization problem, which can be solved by global methods such as simulated annealing and graph cuts.

More recently, researches have used multiple cameras spanning a wider synthetic aperture to capture light field images (e.g. the Stanford Multi-Camera Array). A light field, which is often defined as a 4D function characterizing the light from all direction at all points in a scene, can be interpreted as a two-dimensional (2D) collection of 2D images of a scene. Due to practical constraints, it is typically difficult to simultaneously capture the collection of 2D images of a scene that form a light field. However, the closer in time at which the image data is captured by each of the cameras, the less likely that variations in light intensity (e.g. the otherwise imperceptible flicker of fluorescent lights) or object motion will result in time dependent variations between the captured images. Processes involving capturing and resampling a light field can be utilized to simulate cameras with large apertures. For example, an array of M×N cameras pointing at a scene can simulate the focusing effects of a lens as large as the array. Use of camera arrays in this way can be referred to as synthetic aperture photography.

While stereo matching was originally formulated as the recovery of 3D shape from a pair of images, a light field captured using a camera array can also be used to reconstruct a 3D shape using similar algorithms to those used in stereo matching. The challenge, as more images are added, is that the prevalence of partially occluded regions (pixels visible in some but not all images) also increases.

SUMMARY OF THE INVENTION

Systems and methods in accordance with embodiments of the invention enable the correction of user identified artifacts in light field images. One embodiment of the invention is a method for correcting artifacts in a light field image rendered from a light field obtained by capturing a set of images from different viewpoints and initial depth estimates for pixels within the light field using a processor configured by an image processing application, where the method includes: receiving a user input indicating the location of an artifact within said light field image; selecting a region of the light field image containing the indicated artifact; generating updated depth estimates for pixels within the selected region; and re-rendering at least a portion of the light field image using the updated depth estimates for the pixels within the selected region.

In a further embodiment, the rendering of the light field image utilizes initial visibility information with respect to pixels in the light field and the method further includes generating updated visibility information for pixels within the selected region. In addition, re-rendering at least a portion of the light field image further includes using the updated visibility information for the pixels within the selected region.

Another embodiment also includes receiving a user input validating the re-rendering of the at least a portion of the light field image, and updating the light field image, the initial depth estimates, and the initial visibility information.

In a still further embodiment, the set of images includes images captured in a plurality of color channels.

In still another embodiment, the light field image is rendered from the light field and the depth estimates using a super-resolution process.

In a yet further embodiment, receiving a user input indicating the location of an artifact within said light field image includes receiving a user selection of at least one pixel in said light field image.

In yet another embodiment, selecting a region of the light field image containing the indicated artifact further includes identifying additional pixels within the neighborhood of the at least one selected pixel in said light field image.

In a further embodiment again, identifying additional pixels further includes identifying pixels within a predetermined neighborhood surrounding each of the at least one selected pixel in said light field image.

In another embodiment again, identifying additional pixels further includes identifying pixels within a neighborhood surrounding each of the at least one selected pixel in said light field image that adapts based upon the local characteristics of the pixels in the neighborhood of the at least one selected pixel.

In a further additional embodiment, the initial depth estimates include confidence metrics describing the reliability of the initial depth estimates, and identifying additional pixels further includes identifying pixels having depth estimates with associated confidence metrics below a threshold.

In another additional embodiment, generating updated depth estimates for pixels within the selected region further includes receiving a user input identifying of a region of said light field image that does not contain said artifact, and determining an updated depth estimate based upon the initial depth estimates of pixels within the identified region of said light field image.

In a still yet further embodiment, receiving a user input identifying a region of said light field image that does not contain said artifact further includes receiving a user selection of at least one pixel in said light field image.

In still yet another embodiment, receiving a user input identifying a region of said light field image that does not contain said artifact further includes identifying additional pixels within the neighborhood of the at least one selected pixel in said light field image.

In a still further embodiment again, identifying additional pixels further includes identifying pixels within a predetermined neighborhood surrounding each of the at least one selected pixel in said light field image.

In still another embodiment again, identifying additional pixels further includes identifying pixels within a neighborhood surrounding each of the at least one selected pixel in said light field image that adapts based upon the local characteristics of the pixels in the neighborhood of the at least one selected pixel.

In a still further additional embodiment, determining an updated depth estimate based upon the initial depth estimates of pixels within the identified region of said light field image further includes averaging the initial depths of pixels within the identified region that does not contain said artifact, and updating the depth estimates of pixels within the selected region containing said artifact.

In still another additional embodiment, the initial depth estimates include confidence metrics describing the reliability of the initial depth estimates; and averaging the initial depths of pixels within the identified region further includes filtering pixels from the averaging process that have depth estimates with confidence metrics that are below a threshold level of reliability.

In a yet further embodiment again, the confidence metrics include a set of confidence values associated with the depth information assigned to at least one pixel within the light field image; and updating the depth estimates of pixels within the selected region containing said artifact further includes: comparing the confidence value associated with a given pixel within the selected region containing said artifact to a second confidence value associated with at least one pixel in the identified region of the light field image that does not contain said artifact; and when the difference between the first and second confidence values is less than a threshold, updating the depth estimate of the given pixel with said average depth estimate.

In yet another embodiment again, averaging the initial depths of pixels within the identified region further includes filtering pixels from the averaging process that are outliers relative to the other pixels within the identified region that does not contain said artifact.

In a yet further additional embodiment, generating updated depth estimates further includes: receiving a user input indicating a specific depth; and determining updated depth estimates for pixels in the selected region of said light field image containing said artifact based upon said specific depth.

In yet another additional embodiment, determining updated depth estimates for pixels in the selected region of said light field image containing said artifact based upon said specific depth further includes: comparing a confidence value associated with a given pixel within the selected region containing said artifact to a second confidence value associated with the specific depth indicated by the user input; and when the difference between the first and second confidence values is less than a threshold, updating the depth estimate of the given pixel with said specific depth.

In a further additional embodiment again, generating updated depth estimates further includes: iteratively re-rendering a portion of said light field image containing said artifact in response to received user inputs indicating a plurality of potential depths; and determining updated depth estimates for pixels in the selected region of said light field image containing said artifact based upon receipt of a user input validating one of said plurality of potential depths.

In another additional embodiment again, the rendering of the light field image utilizes initial visibility information with respect to pixels in the light field and the method further includes generating updated visibility information for pixels within the selected region by re-rendering a portion of said light field image multiple times by applying different visibility information to the light field, and determining updated visibility information for pixels in the selected region of said light field image containing said artifact based upon receipt of a user input selecting one of said multiple renderings of said portion of said light field image.

In another further embodiment, the rendering of the light field image utilizes initial visibility information with respect to pixels in the light field and the method further includes generating updated depth estimates and visibility information for pixels within the selected region by searching a plurality of combinations of depth and visibilities for pixels within the selected region of said light field image containing said artifact, and selecting one of said plurality of combinations of depth and visibilities based upon the selection resulting in the best overall match between the pixels in the selected region of said light field image and corresponding pixels within the light field, where the corresponding pixels within the light field are identified based upon the selected depth and visibilities.

In still another further embodiment, re-rendering at least a portion of the light field image using the updated depth estimates for the pixels within the selected region further includes using a super-resolution process to re-render said at least a portion of the light field image.

In yet another further embodiment, re-rendering at least a portion of the light field image using the updated depth estimates for the pixels within the selected region further includes shifting pixels within the selected region along epipolar lines based upon the updated depth estimates.

An image processing system in accordance with an embodiment of the invention includes: a processor; and memory (or other form of non-transitory machine readable media) containing an image processing application. In addition, the image processing application configures the processor to: receive a user input indicating the location of an artifact within said light field image rendered from a light field obtained by capturing a set of images from different viewpoints and initial depth estimates for pixels within the light field; select a region of the light field image containing an indicated artifact; generate updated depth estimates for pixels within a selected region; and re-rendering at least a portion of a light field image using the updated depth estimates for the pixels within the selected region.

A further embodiment also includes an array camera module. In addition, the image processing application configures the processor to: capture a set of images from different viewpoints; generate initial depth estimates based upon the disparity between corresponding pixels in a captured set of images; render a light field image using a super-resolution process based upon a set of images and initial depth estimates; and store a rendered light field image in said memory.

BRIEF DESCRIPTION OF THE DRAWINGS

FIG. 2C conceptually illustrates a color filter pattern for a 4×4 array camera module in accordance with an embodiment of the invention.

Figures 7A, 7B, 7C, 7D:
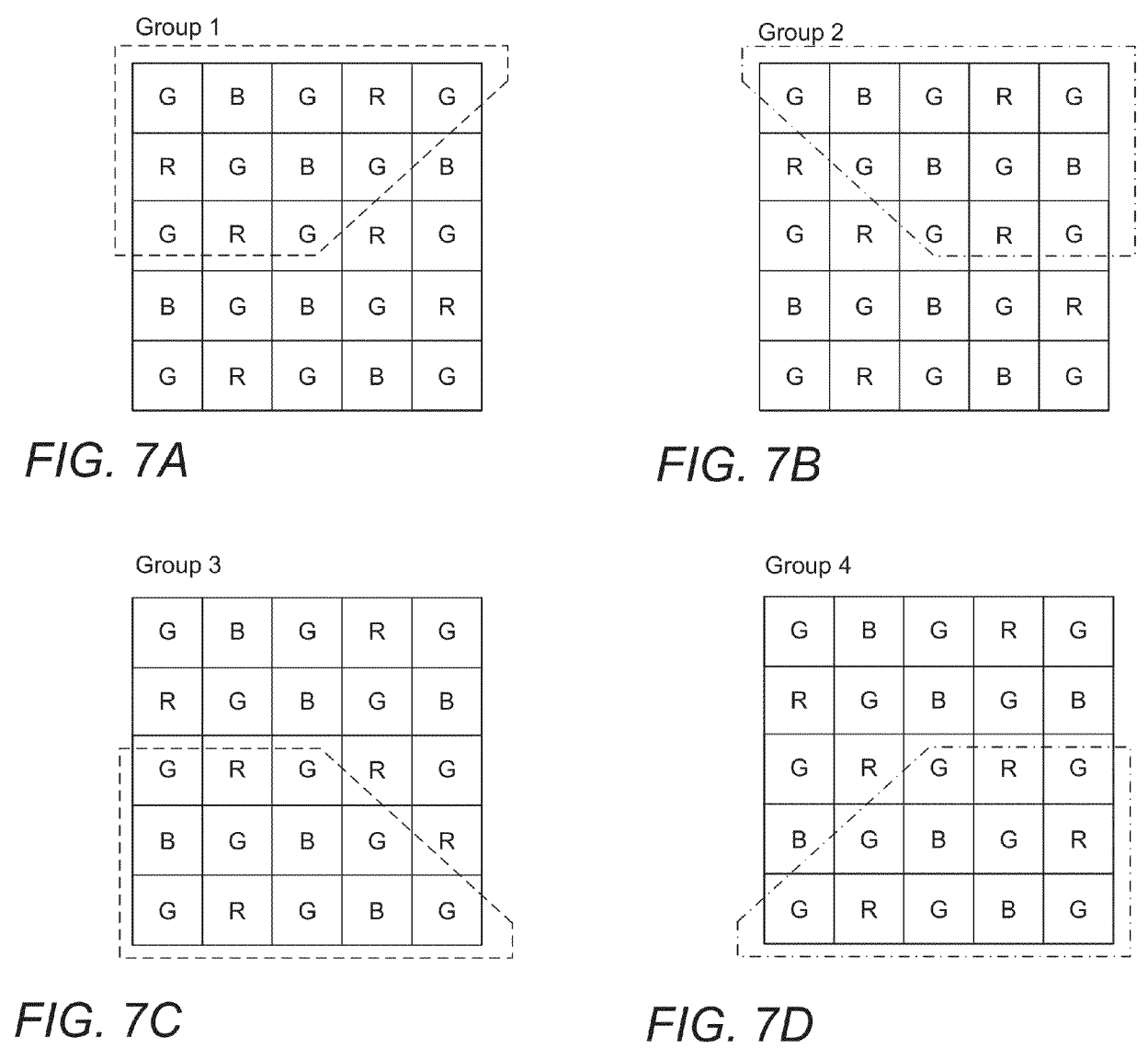
Figures 7E, 7F, 7G, 7H:
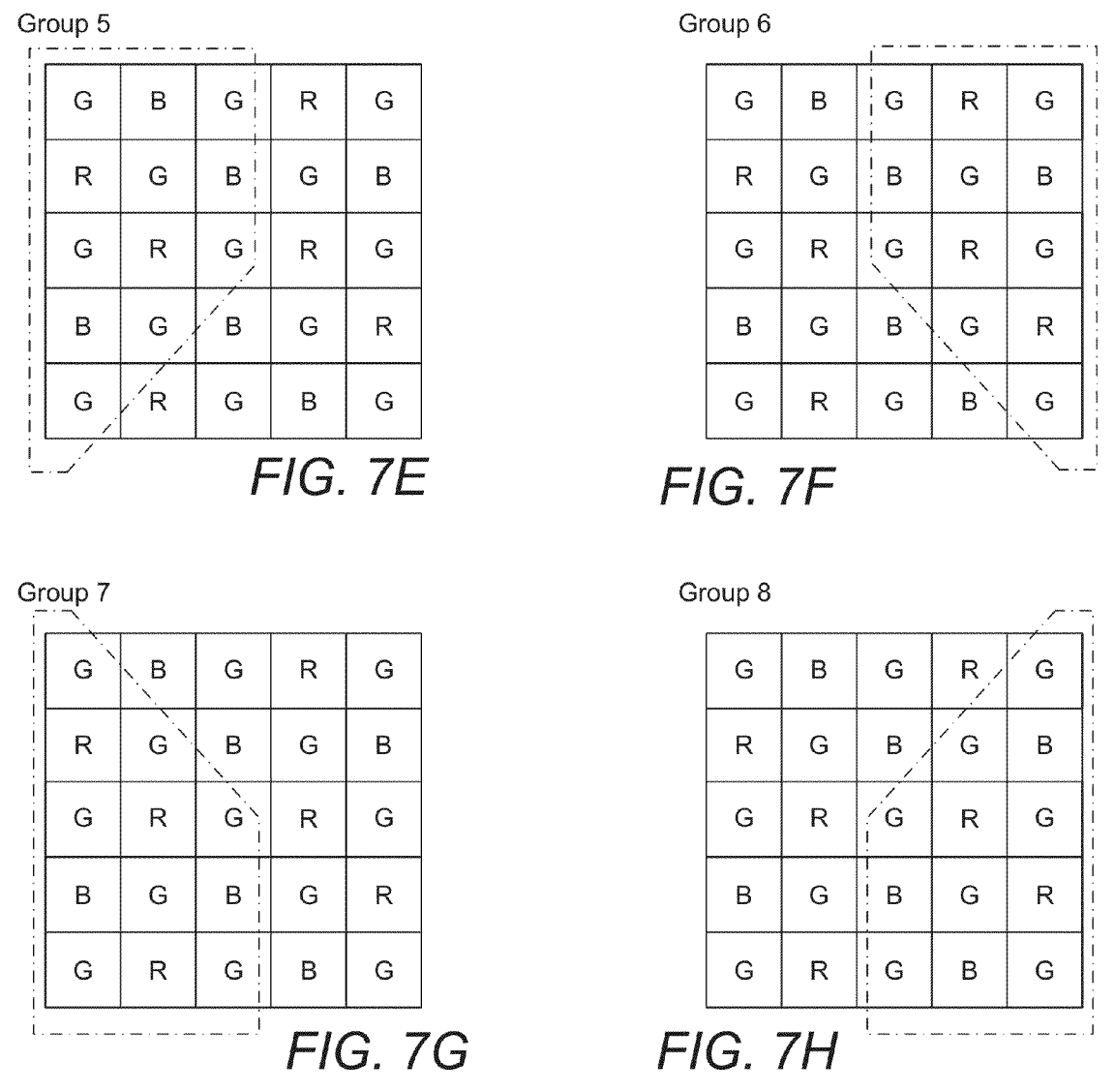
Figures 7I, 7J, 7K, 7L:
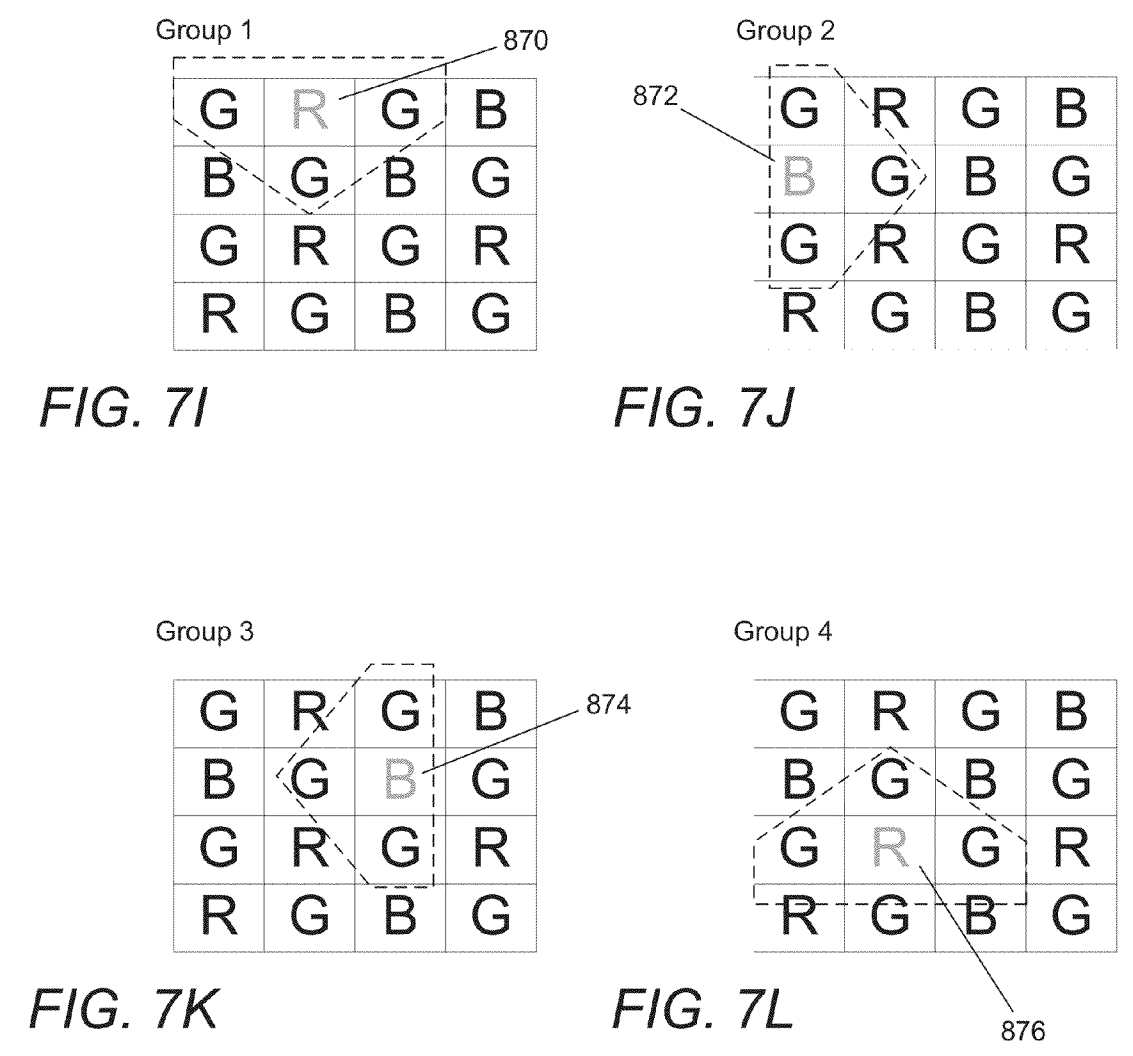

FIGS. 7A-7H conceptually illustrate subsets of cameras in a 5×5 array camera that correspond to patterns of visibility typical of real world scenes, which can be utilized to pre-render portions of light field images containing one or more artifacts in accordance with embodiments of the invention.

FIGS. 7I-7L conceptually illustrate subsets of cameras in a 4×4 array camera that correspond to patterns of visibility typical of real world scenes, which can be utilized to pre-render portions of light field images containing one or more artifacts in accordance with embodiments of the invention.

DETAILED DESCRIPTION

Figure 1:
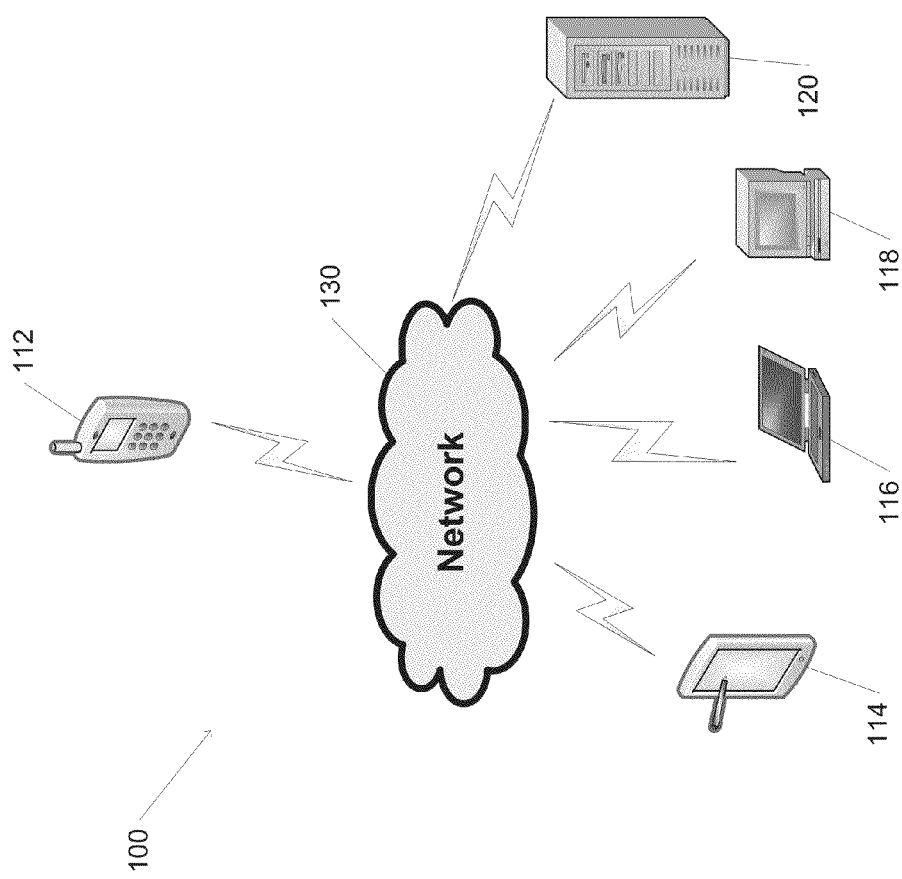
FIG. 1 is a system overview of computing devices capable of manipulating light field images in accordance with an embodiment of the invention.

Turning now to the drawings, systems and methods for correcting user identified artifacts in light field images in accordance with embodiments of the invention are illustrated. Array cameras, such as those described in U.S. patent application Ser. No. 12/935,504 entitled "Capturing and Processing of Images using Monolithic Camera Array with Heterogeneous Imagers" to Venkataraman et al., can be utilized to capture light field images. In a number of embodiments, super-resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the cameras in the array camera. Due to the different viewpoint of each of the cameras, parallax results in variations in the position of objects within the different images of the scene. Techniques for determining pixel disparity as a result of parallax between the different cameras in the array, so that appropriate scene-dependent geometric shifts can be applied to the pixels of the captured images when performing super-resolution processing are described in U.S. patent application Ser. No. 13/972,881 entitled "Systems and Methods for Parallax Detection and Correction in Images Captured Using Array Cameras that Contain Occlusions using Subsets of Images to Perform Depth Estimation", filed Aug. 21, 2013. The disclosure of U.S. patent application Ser. No. 13/972,881 is hereby incorporated by reference in its entirety.

A high resolution image synthesized using super-resolution processing is synthesized from a specific viewpoint that can be referred to as a reference viewpoint. The reference viewpoint can be from the viewpoint of one of the cameras in a camera array. Many array cameras capture color information using different cameras (see for example the array cameras disclosed in U.S. patent application Ser. No. 12/935,504). In many embodiments, the viewpoint of a Green camera is utilized as the reference viewpoint. In several embodiments, the array camera can include one or more cameras that capture image data in multiple color channels. For example, an array camera may include at least one camera that has a Bayer color filter pattern and that is used as a reference camera. Alternatively, the reference viewpoint can be an arbitrary virtual viewpoint where there is no physical camera. A benefit of synthesizing a high resolution image from the viewpoint of one of the cameras (as opposed to a virtual viewpoint) is that the disparity of the pixels in the light field can be determined with respect to the image in the light field captured from the reference viewpoint. When a virtual viewpoint is utilized, none of the captured image data is from the reference viewpoint and so the process instead relies solely on cameras away from the reference viewpoint to determine the best match.

Array cameras in accordance with many embodiments of the invention use the disparity between the pixels in the images within a light field to generate a depth map from the reference viewpoint. A depth map indicates the distance of scene objects from a reference viewpoint and can be utilized to determine scene dependent geometric corrections to apply to the pixels from each of the images within a captured light field to correct for disparity when performing super-resolution processing. In many embodiments, the depth map is expressed in terms of depth estimates for individual pixels or groups of pixels within a light field image synthesized from a reference viewpoint. Depth estimates can also be determined for pixels that are occluded in the reference viewpoint. In several embodiments, an initial depth map of the reference viewpoint is generated and as part of that process, or as a subsequent process, occluded pixels and/or other types of mismatched pixels are detected. The process of detecting pixels that are occluded can also be thought of as determining whether a pixel in an image captured from the reference viewpoint is visible in the image from a non-reference viewpoint. When a pixel in the image captured from the reference viewpoint is not visible in a second image, utilizing image data from the second image when determining the depth of the pixel in the reference image introduces error into the depth determination. Therefore, by detecting the pixels in the reference image that are occluded in one or more images in the light field, the accuracy of the depth map can be improved.

A depth map from a reference viewpoint can be utilized to determine the scene dependent geometric shifts that are likely to have occurred in images captured from other viewpoints. These scene dependent geometric shifts can be utilized in super-resolution processing. In addition, the scene dependent geometric shifts can be utilized to refine the determinations of the visibility of pixels within the light field from the reference viewpoint. In several embodiments, visibility information is generated and provided along with the depth map for use in super-resolution processing.

Once a depth map and visibility information are generated for the pixels in the light field, the depth map and visibility information can be provided to a super-resolution processing pipeline to synthesize a higher resolution 2D image of the scene. This process can also be referred to as rendering a light field image. The depth map can be utilized to correct for parallax between the different low resolution images and visibility information can be utilized during fusion to avoid the fusion of occluded pixels (i.e. pixels in an alternate view image that are not visible from the reference viewpoint). In several embodiments, the process of generating a depth map also includes generating a confidence map that includes confidence metrics for the depth estimates in the depth map. In many embodiments, the confidence metrics encode at least one confidence factor indicative of the reliability of the corresponding depth estimate.

Where a parallax detection process results in errors in the depth estimates and/or the visibility information, the errors can translate into artifacts in a rendered light field image. These artifacts may be apparent in any color channel and are a function of the fact that the super-resolution processes used to render the light field images rely upon the assumption of accurate image registration, which includes the elimination of disparity due to parallax and the discarding of pixels that are not visible in the reference viewpoint. In several embodiments, a user interface is provided that enables a user to identify artifacts in light field images and provide feedback that assists in the determination of the correct depth and/or visibility of the pixels within the captured light fields that are responsible for the identified artifacts. Corrected depth information can be provided to an image processing application configured to perform a super-resolution process to re-render the light field image using the updated depth and/or visibility information with the goal of reducing and/or eliminating the artifact(s) identified by the user. Although much of the discussion that follows references the use of super-resolution processing to re-render light field images and/or portions of light field images, it should be appreciated that light field images can be re-rendered from appropriately formatted light field image data, such as but not limited to light field image data stored in the manner outlined in U.S. patent application Ser. No. 13/631,736 entitled "Systems and Methods for Decoding Light Field Image Files", filed Sep. 28, 2012 by shifting pixel locations based upon updated depth and/or visibility information, and revealing otherwise occluded pixels. Accordingly, the term rendering and/or re-rendering should not be understood as necessarily limited to the use of a super-resolution process. The disclosure of U.S. patent application Ser. No. 13/631,736 is hereby incorporated by reference in its entirety.

Although the invention is described with respect to light field images having depth information, in many embodiments any image having depth information may be utilized. Systems and methods for identifying and correcting depth related artifacts in rendered light field images in accordance with embodiments of the invention are discussed below.

System Overview

Users can utilize a variety of devices to view and interact with light field images in accordance with embodiments of the invention. A network diagram illustrating variety of devices that users can utilize to view, interact and share light field images in accordance with an embodiment of the invention is illustrated in FIG. 1. The content sharing network 100 includes a variety of devices including (but not limited to) smartphones 112, tablets 114, personal computers 116, picture kiosks 118, and servers 120 that are configured to transfer files containing light field images via a network 130. In several embodiments, the devices capable of interacting with light field images employ touch screen interfaces and/or 3D display capabilities. In a number of embodiments, devices capable of interacting with light field images include a front-facing camera and/or an array camera, where the front-facing camera is capable of tracking user movements and the array camera is capable of capturing light fields. In several embodiments, the front-facing camera is an array camera. In many embodiments, the user interface provided by the device enables users to identify and correct artifacts in a rendered light field image. In other embodiments, artifacts are automatically identified and corrected.

Devices in accordance with embodiments of the invention can utilize any of a variety of user interfaces to interact with light field images. In a number of embodiments, devices capable of manipulating light field images employ touchscreen-based interfaces. By utilizing touchscreen-based interfaces, users can select regions in a light field image in order to identify any depth related artifacts, and can provide correct depth information. In many embodiments, the correct depth information can be provided in a variety of ways including (but not limited to) provided by indicating the correct boundaries of areas and/or regions within the image that contain pixels with which the correct depth is associated. User guided boundary selection can be utilized to perform segmentation of foreground objects from background objects.

Although specific devices are described above with respect to FIG. 1, any device capable of manipulating a light field image, including devices with capabilities not discussed above, can be utilized to enable a user to identify artifacts in light field images and provide feedback that assists in the determination of the correct depth and/or visibility of the pixels responsible for the identified artifacts as appropriate to the requirements of specific applications in accordance with embodiments of the invention. Array cameras that are configured to generate light field images and that enable users to identify and correct artifacts in the generated light field images in accordance with embodiments of the invention are discussed further below.

Array Cameras

Figure 2A:
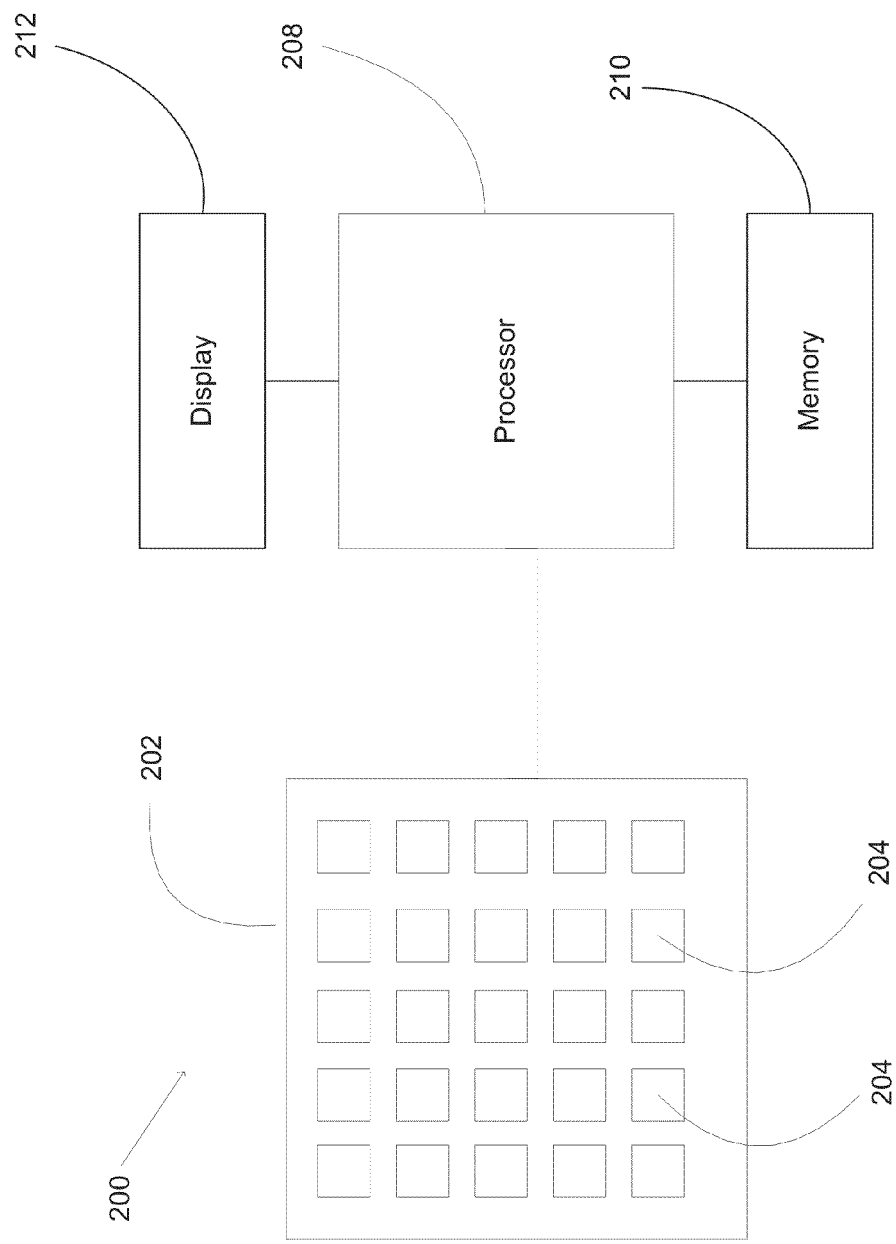
FIG. 2A conceptually illustrates an array camera in accordance with an embodiment of the invention.

Array cameras in accordance with many embodiments of the invention can include a camera module including an array of cameras and a processor configured to read out and process image data from the camera module to synthesize light field images. An array camera in accordance with an embodiment of the invention is illustrated in FIG. 2A. The array camera 200 includes a camera module 202 with an array of individual cameras 204 where an array of individual cameras refers to a plurality of cameras in a particular arrangement, such as (but not limited to) the square arrangement utilized in the illustrated embodiment. The camera module 202 is connected to a processor 208. The processor 208 is also configured to communicate with one or more different types of memory 210 that can be utilized to store image data and/or contain machine readable instructions, such as an image processing application, utilized to configure the processor to perform processes including (but not limited to) the various processes described below. In many embodiments, the memory contains an image processing application that is configured to process a light field comprising a plurality of images to generate a depth map(s), a visibility map(s), a confidence map(s), and/or a higher resolution image(s) using any of the processes outlined in detail below. As is discussed further below, a depth map typically provides depth estimates for pixels in an image from a reference viewpoint (e.g. a higher resolution image synthesized from a reference viewpoint). A variety of visibility maps can be generated as appropriate to the requirements of specific applications including (but not limited to) visibility maps indicating whether pixel locations in a reference image are visible in specific images within a light field, visibility maps indicating whether specific pixels in an image within the light field are visible from the reference viewpoint, and visibility maps indicating whether a pixel visible in one alternate view image is visible in another alternate view image. In other embodiments, any of a variety of applications can be stored in memory and utilized to process image data using the processes described herein. In several embodiments, processes in accordance with embodiments of the invention can be implemented in hardware using an application specific integrated circuit, and/or a field programmable gate array, or implemented partially in hardware and software.

Processors 108 in accordance with many embodiments of the invention are configured using appropriate software to take the image data within the light field and synthesize one or more high resolution images. In several embodiments, the high resolution image is synthesized from a reference viewpoint, typically that of a reference focal plane 204 within the sensor 202. In many embodiments, the processor is able to synthesize an image from a virtual viewpoint, which does not correspond to the viewpoints of any of the focal planes 204 in the sensor 202. The images in the light field will include a scene-dependent disparity due to the different fields of view of the focal planes used to capture the images.

In the illustrated embodiment, the array camera includes a display capable of displaying light field images synthesized by the processor. In several embodiments, the display 212 is capable of displaying 3D images. In a number of embodiments, the processor 208 is capable of receiving user input via any of a variety of user input mechanism including (but not limited to) a touchscreen interface, a pointing device, and/or a keyboard. In several embodiments, the user input can be received via a camera or array camera capable of tracking user movements. In a number of embodiments, the user input can be received via a microphone capable of detecting audio inputs. In many embodiments, a user interface provided by the device enables a user to identify artifacts in light field images and provide feedback that assists in the determination of the correct depth and/or visibility of the pixels responsible for the identified artifacts. The corrected depth and/or visibility information can then be utilized to resynthesize a high resolution image with a goal of reducing and/or eliminating the impact of the identified artifact on the resulting image.

In a number of embodiments, the processor 208 is connected to a network interface (not shown) that enables the array camera to share light field images via a network. Although a specific array camera architecture is illustrated in FIG. 2A, alternative architectures can also be utilized in accordance with embodiments of the invention.

Array Camera Modules

Array camera modules in accordance with several embodiments of the invention can be constructed from an imager array or sensor including an array of focal planes and an optic array including a lens stack for each focal plane in the imager array. Sensors including multiple focal planes are discussed in U.S. patent application Ser. No. 13/106,797 entitled "Architectures for System on Chip Array Cameras", to Pain et al., the disclosure of which is incorporated herein by reference in its entirety. Light filters can be used within each optical channel formed by the lens stacks in the optic array to enable different cameras within an array camera module to capture image data with respect to different portions of the electromagnetic spectrum (i.e. within different spectral channels).

Figure 2B:
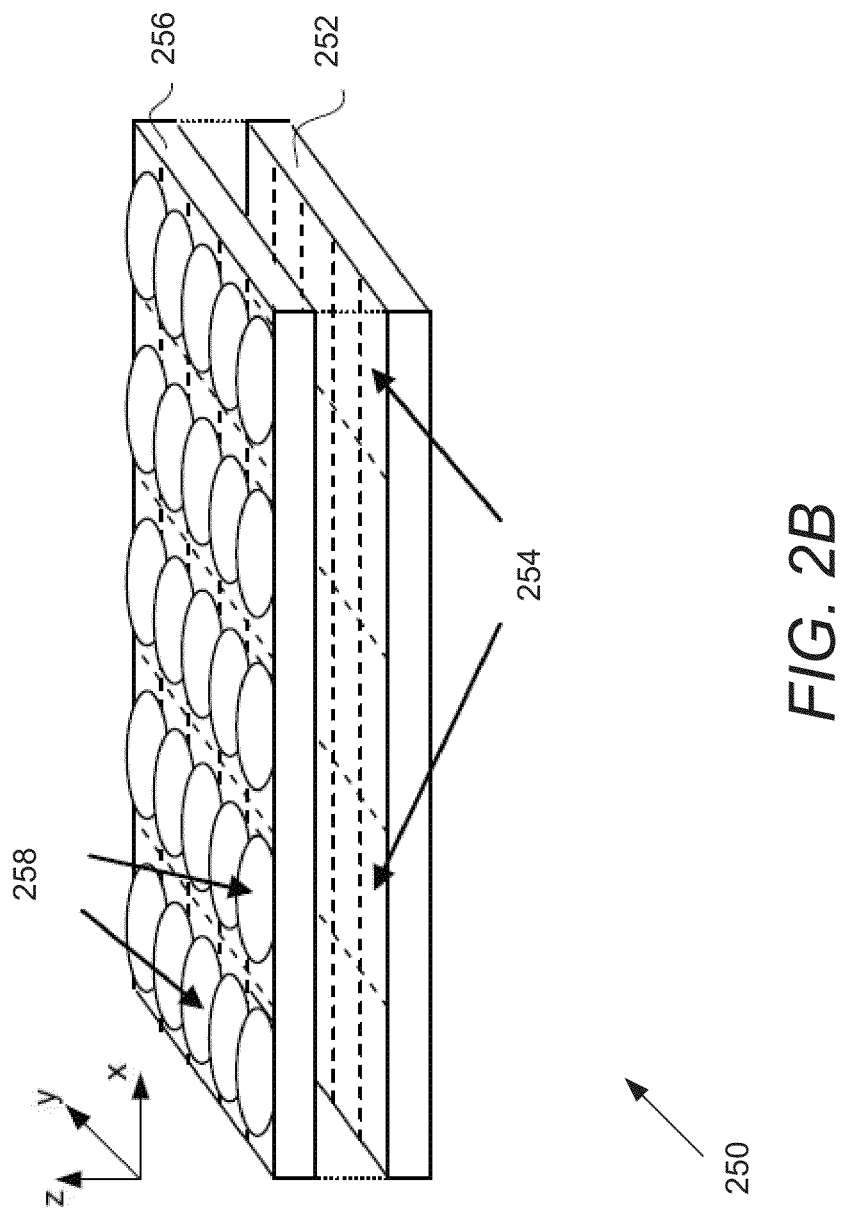
FIG. 2B conceptually illustrates a 5×5 array camera module in accordance with an embodiment of the invention.

An array camera module in accordance with an embodiment of the invention is illustrated in FIG. 2B. The array camera module 250 includes an imager array 252 including an array of focal planes 254 along with a corresponding optic array 256 including an array of lens stacks 258. Within the array of lens stacks, each lens stack 258 creates an optical channel that forms an image of the scene on an array of light sensitive pixels within a corresponding focal plane 254. Each pairing of a lens stack 258 and focal plane 254 forms a single camera 204 within the camera module. Each pixel within a focal plane 254 of a camera 204 generates image data that can be sent from the camera 204 to the processor 208. In many embodiments, the lens stack within each optical channel is configured so that pixels of each focal plane 258 sample the same object space or region within the scene. In several embodiments, the lens stacks are configured so that the pixels that sample the same object space do so with sub-pixel offsets to provide sampling diversity that can be utilized to recover increased resolution through the use of super-resolution processes. The term sampling diversity refers to the fact that the images from different viewpoints sample the same object in the scene but with slight sub-pixel offsets. By processing the images with sub-pixel precision, additional information encoded due to the sub-pixel offsets can be recovered when compared to simply sampling the object space with a single image.

In the illustrated embodiment, the focal planes are configured in a 5×5 array. Each focal plane 154 on the sensor is capable of capturing an image of the scene. Typically, each focal plane includes a plurality of rows of pixels that also forms a plurality of columns of pixels, and each focal plane is contained within a region of the imager that does not contain pixels from another focal plane. In many embodiments, image data capture and readout of each focal plane can be independently controlled. In this way, image capture settings including (but not limited to) the exposure times and analog gains of pixels within a focal plane can be determined independently to enable image capture settings to be tailored based upon factors including (but not limited to) a specific color channel and/or a specific portion of the scene dynamic range. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

Figure 2C:
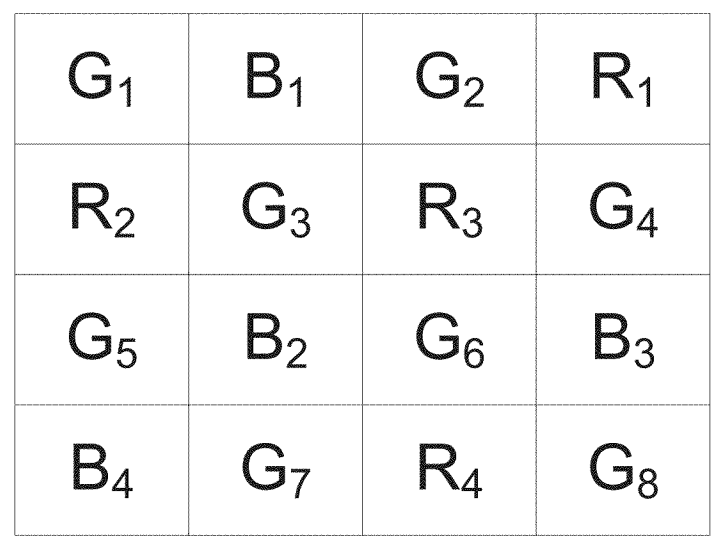

In several embodiments, color filters in individual cameras can be used to pattern the camera module with π filter groups as further discussed in U.S. Provisional patent application Ser. No. 13/875,248 entitled "Camera Modules Patterned with pi FilterGroups" filed May 1, 2013, the disclosure of which is incorporated by reference herein in its entirety. Any of a variety of color filter configurations can be utilized including the configuration in FIG. 2C including eight Green cameras, four Blue cameras, and four Red cameras, where the cameras are distributed around the center of the camera. The cameras can be used to capture data with respect to different colors, or a specific portion of the spectrum. In contrast to applying color filters to the pixels of the camera, color filters in many embodiments of the invention are included in the lens stack. For example, a Green color camera can include a lens stack with a Green light filter that allows Green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including π filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

Although specific array cameras and imager arrays are discussed above, many different array cameras can be utilized to capture image data and synthesize images in accordance with embodiments of the invention. Systems and methods for correcting user identified artifacts in light field images generated from pixels in light fields captured by array cameras in accordance with embodiments of the invention are discussed below.

Interactive Artifact Correction of Regions in Light Field Images

Interactive artifact correction allows for the correction of depth related artifacts by modifying the depth estimates and/or visibility information associated with pixels in regions of a light field image and re-rendering the light field image in real time based upon user input until the artifacts are corrected. In many embodiments, the locations of artifacts within a light field image are identified based upon user input. User input can also be utilized to provide guidance concerning the appropriate depth and/or visibility of pixels within the region containing the artifact. In several embodiments, users provide depth information by indicating another region of the image that captures objects located at a similar depth. In a number of embodiments, the process of indicating depth is interactive. In certain embodiments, a depth slider is provided and the user can modify the depth slider to observe whether changing the depth estimate reduces the appearance of an artifact contained within an image portion that is re-rendered in real time in response to the user input. Similarly, various image portions rendered using different combinations of likely depth estimates and/or visibility patterns can be presented to the user and the user can select the image portion in which the artifact is least noticeable.

Figure 3:
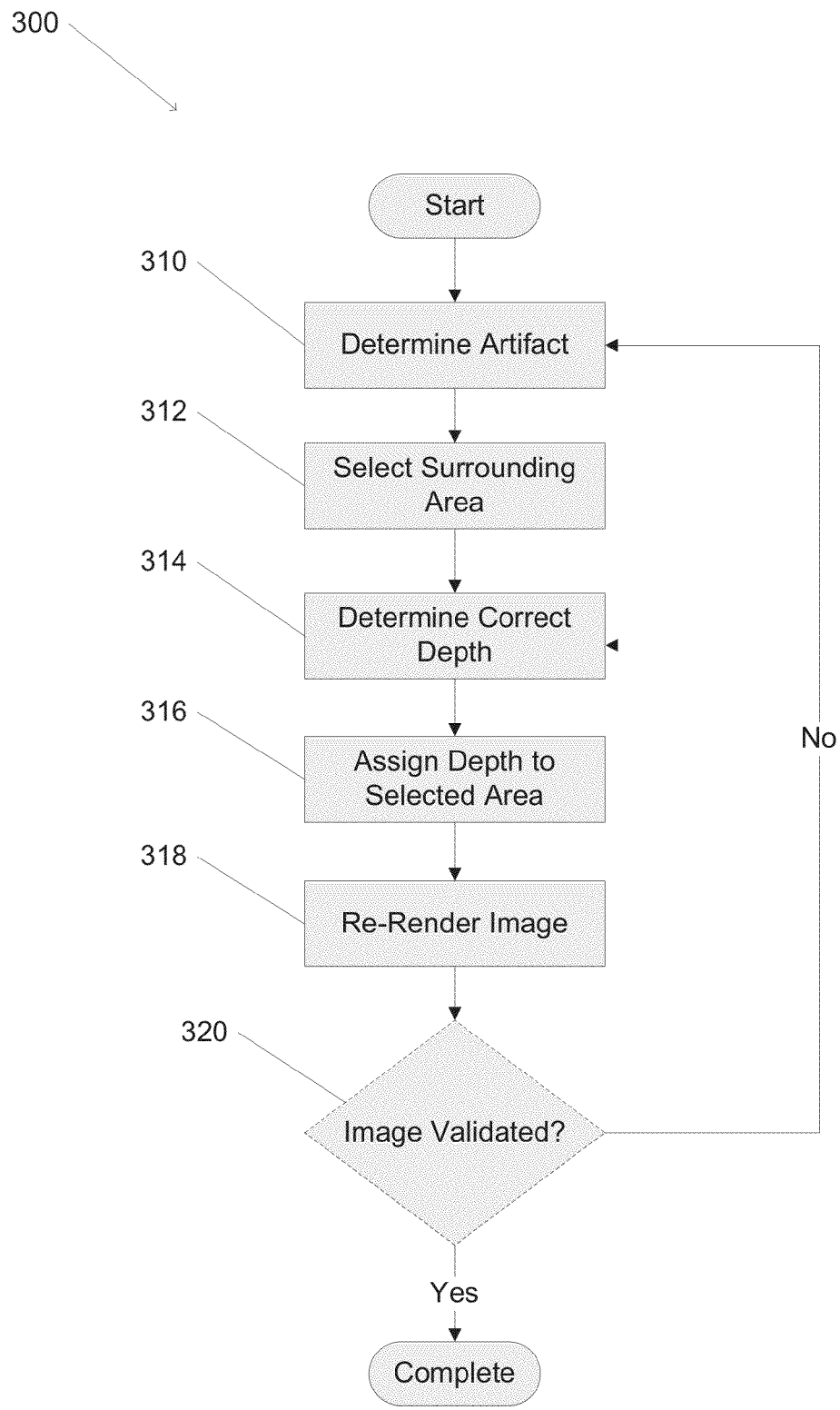
FIG. 3 is a flow chart illustrating an interactive process for correcting artifacts in light field images in accordance with an embodiment of the invention.

A process for interactive artifact correction of regions in a light field image that contain artifacts in accordance with an embodiment of the invention is illustrated in FIG. 3. The process 300 includes determining (310) the location of one or more artifacts in a light field image. An area surrounding the artifact is selected (312). The correct depth and/or visibility information for the image data used to synthesize the selected (312) area of the light field image is determined (314). The correct depth(s) and/or visibility information is assigned (316) to the pixels from the captured light field used to synthesize the selected area and at least the selected area of the light field image is re-rendered (318). In accordance with many embodiments of the invention, the re-rendered (318) light field image can be validated (320). If the artifacts have been removed or corrected within a threshold value, the re-rendered image is validated (320) and the process 300 completes. In many embodiments, the process iterates until the selected area is validated (320), and until the entire image is validated (i.e. all of the artifacts within the image have been addressed).

In several embodiments, the locations of artifacts may be determined (310) manually and/or via an automated process. In a number of embodiments, the location of artifacts is determined (310) in response to user inputs such as (but not limited to) pointing and/or clicking on the location of an artifact utilizing a touch interface, a mouse, trackpad, or other pointing device. In many embodiments, the location of an artifact is determined (310) based upon a user looking at an artifact and having the artifact selected utilizing eye tracking techniques to identify an image location from a real time stream of video in which the user's eyes are visible. In several embodiments, the location of an artifact can be determined (310) automatically utilizing a classifier configured to detect artifacts. Various techniques for enabling a user to provide input identifying the location of a region containing an artifact in accordance with embodiments of the invention are discussed below with reference to FIGS. 4 and 5.

In many embodiments, the location of artifacts can be determined (310) using a confidence map that describes the reliability of depth estimates utilized to synthesize the initial light field image. Confidence maps can be generated at the time of depth map computation using a variety of methods including those techniques disclosed in U.S. patent application Ser. No. 13/972,881, which is incorporated by reference above. A confidence map typically includes confidence metrics for the depth estimates in a depth map. In several embodiments, the confidence metrics encode at least one confidence factor indicative of the reliability of the corresponding depth estimate. In a number of embodiments, the confidence metric includes at least a confidence factor based on the signal to noise ratio (SNR) in the region of the pixel location with which the depth estimate is associated, and a confidence factor based upon the number of pixels in a set of images that correspond to the pixel location with which the depth map is associated that were utilized to generate the depth estimate and/or are occluded.

An area around an artifact can be selected and the depth estimates and/or visibility information of the image data utilized to synthesize the area around the artifact can be modified and the area re-rendered in an attempt to reduce the impact and/or eliminate the presence of the artifact. The selected (312) area surrounding the location of an artifact may have a variety of shapes as appropriate to the requirements of specific applications in accordance with embodiments of the invention. Shapes for selected (312) areas include, but are not limited to, rectangular shapes, fixed non-rectangular shapes such as circles and triangles, and adaptive shapes based upon the determined (310) artifacts. In several embodiments, adaptive shapes are predetermined. Predetermined adaptive shapes include, but are not limited to, masks and shiftable windows. In a number of embodiments, adaptive shapes utilize segmentation techniques to dynamically bound the determined (310) locations of artifacts. Segmentation techniques in accordance with embodiments of the invention utilize one or more aspects of the light field image, including, but not limited to, intensity, color, texture, a confidence map, depth information, and bilateral support as appropriate to the requirements of specific applications. In accordance with numerous embodiments of the invention, the selected (312) area may match the determined (310) location of an artifact and/or may contain padding around the determined (310) location of the artifact. The amount of padding may be predetermined and/or determined dynamically.

Determining (314) the correct depth and/or visibility information for the image data used to synthesize the selected (312) area of the light field image may be performed via user input and/or automatically as appropriate to the requirements of specific applications in accordance with embodiments of the invention. In several embodiments, the correct depth is determined (314) utilizing input received using an input device, such as (but not limited to) a touchscreen interface. In many embodiments, the user can indicate a depth by selecting an area (e.g. a region) within the light field image that has the same depth as the pixels responsible for the selected artifact. In a number of embodiments, the received input is restricted to pixels that have depth estimates with a corresponding high confidence value in a confidence map. In certain embodiments, a depth slider is provided and the user can select a depth as the area of the image is re-rendered in real time. Similarly, the image can be re-rendered using different depth estimates and/or visibility patterns and the user can select the combination that results in the greatest reduction in the artifact. As can be readily appreciated, any of a number of techniques can be utilized to receive depth and/or visibility inputs from users as appropriate to the requirements of specific applications in accordance with embodiments of the invention. Various techniques for receiving user input concerning depth and/or visibility information in accordance with embodiments of the invention are described below with reference to FIG. 6.

In a number of embodiments, the determined (314) depth is a depth sampled from a region of the light field image that is not contained within the selected (312) area. In many embodiments, the determined (314) depth corresponds to the depth of one or more pixels in the selected (312) area. In several embodiments, the depth may be determined (314) utilizing filtering techniques, including, but not limited to, box filters, adaptive filters, and edge-preserving filters. One filter which may be utilized in accordance with embodiments of the invention is a joint bilateral filter modulated by a mask of 1 for high confidence values and 0 for low confidence values. In many embodiments, the determined (314) depth is selected from a predetermined set of depths. The predetermined set of depths can be, but are not limited to, the entire range of depths supported by an array camera, restricted to a number of depths which are based on the selected (312) area, depths with an associated confidence value above a threshold value, and/or those depths that are greater than the depth of the object in whose occlusion map the current set of pixels are located. As can be readily appreciated, any of a number of techniques can be utilized to search different depth estimates and/or visibility patterns in order to reduce the impact of an artifact within an area of a light field image as appropriate to the requirements of specific applications in accordance with embodiments of the invention. Various techniques for automatically selecting alternative depth estimates and/or visibility patterns to utilize in re-rendering an area of a light field image containing an artifact identified by a user in accordance with embodiments of the invention are discussed below with reference to FIG. 6.

In many embodiments, assigning (316) the updated depth to the pixels from the light field data utilized to synthesize a selected (312) area of a light field image is performed by assigning (316) the depth information of one or more pixels in the selected (312) area. In several embodiments, assigning (316) depth to one or more pixels in the selected (312) area utilizes a cost function or a confidence value associated with the depth of the pixels, where the cost or confidence value of the current depth of a pixel is compared to the cost or confidence value of the depth to be assigned to that pixel. In the event that the difference in costs or confidence exceeds a threshold, then the depth estimate for the pixel remains unchanged. When the difference is less than the threshold, then the new depth estimate is utilized with respect to the pixel in the re-rendering of the selected area. In several embodiments, the confidence of the original depth estimate can be utilized in determining the threshold and/or whether to modify the depth estimate for the pixel. A variety of cost functions can be utilized as appropriate to the requirements of specific applications in accordance with embodiments of the invention including (but not limited to) those disclosed in U.S. patent application Ser. No. 13/972,881, which is incorporated by reference above.

In several embodiments, the entire light field image is re-rendered (318) using depth and/or visibility information including the updated depth and/or visibility assigned (316) to the pixels within the selected area of the light field image containing the artifact. In a number of embodiments, only portions of the light field image containing pixels having depths corresponding to the assigned (316) depth are re-rendered. The corresponding portions can include the selected (312) area only and/or areas surrounding the selected (312) area.

The re-rendered (318) light field image or a portion of the light field image that is re-rendered can be validated (320) utilizing a variety of techniques in accordance with embodiments of the invention. In a number of embodiments, validation (320) is performed in real time using input received via an input device. In many embodiments, validation (320) is performed by selecting between multiple versions of a portion of a light field image re-rendered using different depth and/or visibility information. In several embodiments, validation (320) is performed using an automated process, such as (but not limited to) any of the automated processes described above for determining (310) the presence and/or location of artifacts within a light field image.

Although specific processes are described above with reference to FIG. 3 for the interactive correction of artifacts present in light field images synthesized from image data captured by an array camera, any of a variety of processes can be utilized to identify and re-render portions of light field images to reduce the presence of artifacts based upon user input as appropriate to the requirements of specific applications in accordance with embodiments of the invention. Processes for determining new depth estimates and/or visibility information for pixels that form an artifact in a synthesized light field image in accordance with embodiments of the invention are discussed further below.

Correcting User Identified Artifacts

Figure 4:
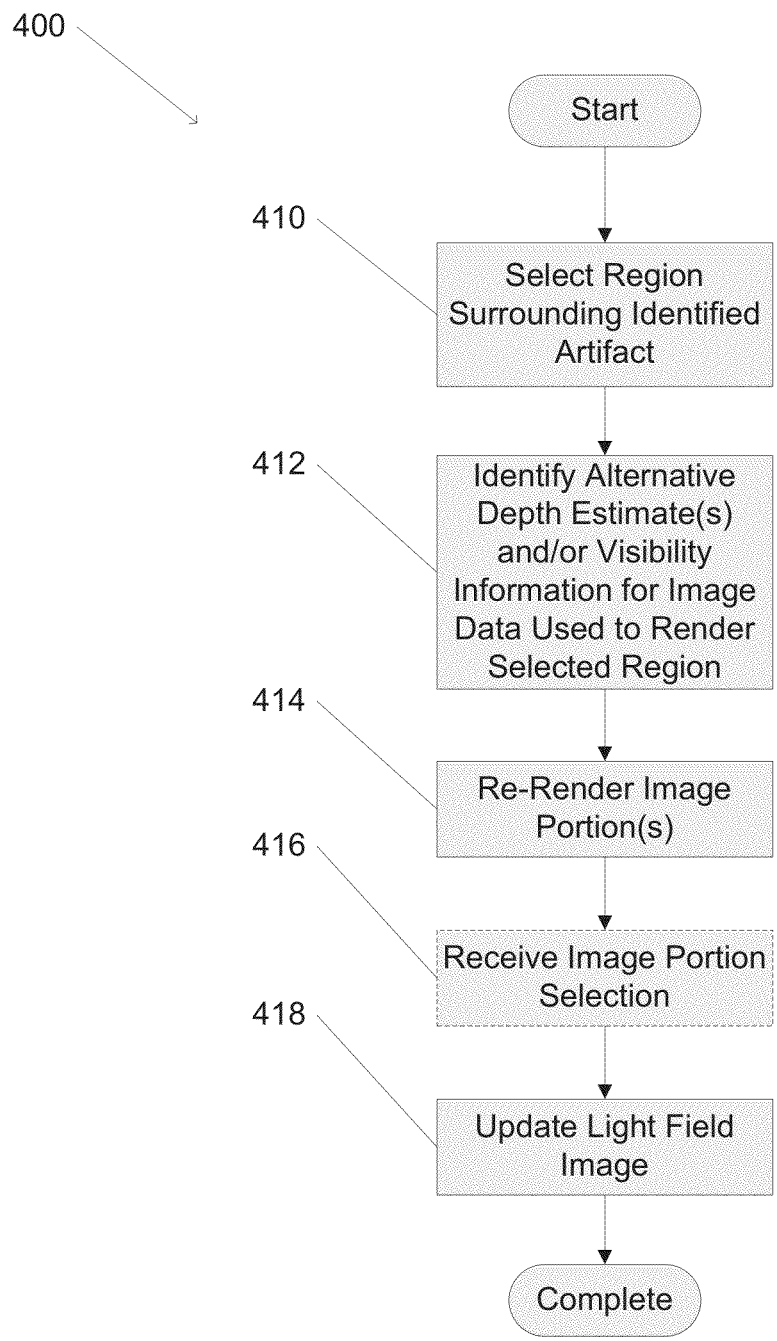
FIG. 4 is a flow chart illustrating a process for correcting a selected artifact in a light field image by updating depth and/or visibility information with respect to pixels that contribute to the artifact in accordance with an embodiment of the invention.

The selection of an artifact by a user enables the correction of the artifact by modifying the depth and/or visibility information of the pixels within the light field that are responsible for the artifact in the rendered light field image. A variety of processes can be utilized to determine the best depth and/or visibility information to utilize, including processes that rely upon user input and processes that are completely automated. A generalized process for correcting user identified artifacts in light field images in accordance with an embodiment of the invention is illustrated in FIG. 4. The process 400 commences with the selection (410) of an area that contains one or more artifacts identified by a user. Techniques that can be used to enable a user to identify an artifact and to select an area surrounding an identified artifact are described further below. In many instances, the artifact identified by the user is the result of incorrect depth estimates and/or visibility information causing the super-resolution process to place pixels in incorrect locations within a synthesized image. The process of reducing the impact of the artifact involves determining the correct depth and/or visibility information for as many of the pixels that are responsible for the artifact as possible. Preferably, the process of correcting the artifact also does not modify the depth and/or visibility of pixels within the selected region containing the artifact that initially were assigned correct depth estimates and visibility information. Accordingly, in a number of embodiments the process only updates the depth and/or visibility information for pixels for which the depth and/or visibility is determined with low confidence.

Although, in many instances it may be unavoidable to modify depth estimates that were initially correct in order to address incorrect depth estimates of other pixels giving rise to an artifact. Accordingly, the process 400 includes identifying (412) alternative depth estimates and/or visibility information for pixels from the light field used to render the selected region of the image. In several embodiments, user input specifying a depth can be utilized as the updated depth estimate. In many embodiments, a search can be conducted with respect to several candidate depth estimates and/or visibility patterns. Processes for selecting candidate depth estimates and visibility patterns in accordance with embodiments of the invention are discussed further below.

Based upon one or more candidate depth estimates and/or visibility patterns, at least one image portion is re-rendered (414) by the super-resolution process. In several embodiments, the depth estimate and/or visibility pattern that results in the greatest reduction in the identified artifact can be selected (416) based upon user input. In addition, the selection can be iterative with the user selecting different depth and/or visibility patterns, observing the re-rendered image portion in real time, and then trying different alternatives until a final image portion is selected. When a final image portion is selected, the light field image is updated (418) in a process that can involve updating the intensity information of the pixels in the rendered light field image, the depth estimates in the depth map, and/or the confidence metrics in the confidence map. In several instances, user validation can be interpreted as a depth estimate determined with a high degree of confidence and this information can be encoded in the confidence metrics for the impacted pixels. The process of updating the light field image can involve re-rendering a portion of the light field image. The re-rendered portion of the light field image can be larger than the selected area containing the artifact so as to avoid the creation of additional artifacts as a result of the re-rendering process.

Although specific processes are described above with reference to FIG. 4 for correcting regions of images containing artifacts identified by a user, any of a variety of specific processes can be utilized to select a region surrounding one or more artifacts, determine updated depth estimates and/or visibility information for pixels within the selected region, and updating the light field image and the metadata describing the light field image as appropriate to the requirements of specific applications in accordance with embodiments of the invention. Processes for identifying artifacts based upon user inputs and for selecting regions containing one or more identified artifacts in which to apply artifact correction processes in accordance with embodiments of the invention are discussed further below.

Identifying Artifacts and Selecting Regions for Processing

An artifact is typically irregularly shaped and the process of correcting an artifact typically involves shifting the pixels creating the artifacts along epipolar lines (defined based upon the cameras that captured the image data used to synthesize the light field image). Therefore, assigning correct depth and visibility estimates to pixels associated with an artifact can impact regions of the image that do not contain the artifact when the light field image is re-rendered. Assigning the correct depth information to a pixel is intended to shift the pixel from a location in the artifact to its correct location somewhere else in the image or remove it from the image, where a pixel in the light field is not actually visible form the reference viewpoint. In many embodiments, a region in the neighborhood of one or more artifacts is re-rendered so that the re-rendering updates the portions of the image containing the artifact and the portions of the image to which pixels are shifted following the updating of their depth and/or visibility information.

Figure 5:
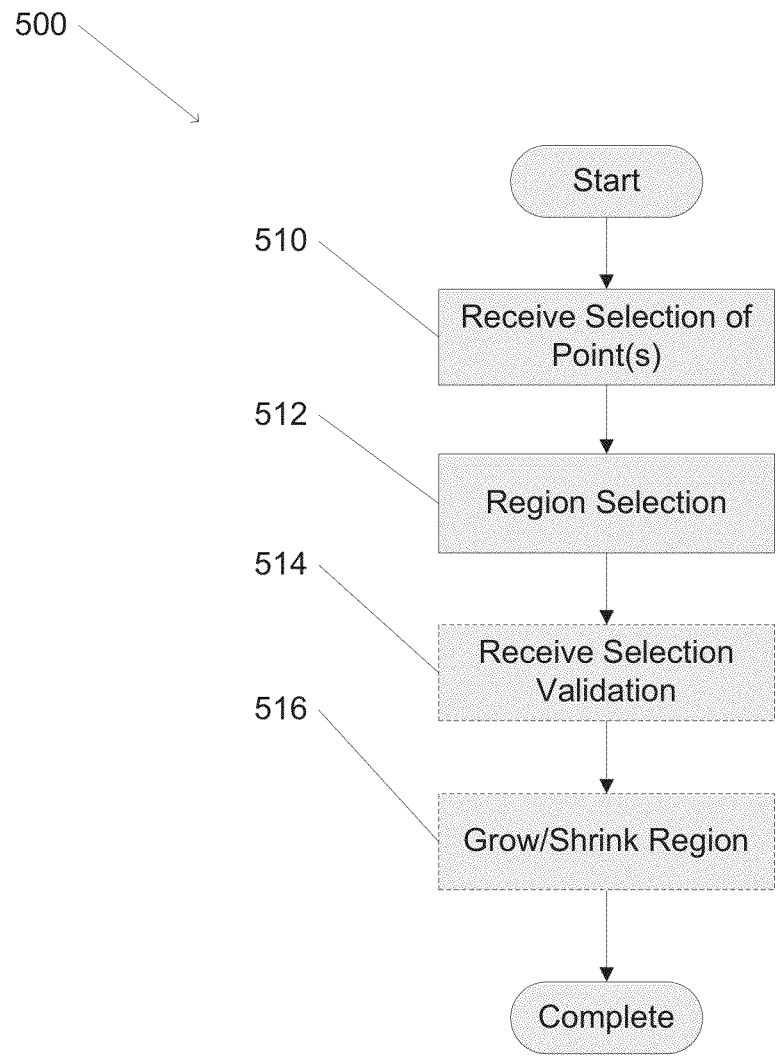
FIG. 5 is a flow chart illustrating a process for selecting a region containing an artifact identified by a user in accordance with an embodiment of the invention.

A process for selecting a region containing a user identified artifact in accordance with an embodiment of the invention is illustrated in FIG. 5. The process 500 includes receiving (510) a user selection of at least one pixel in a light field image corresponding to an artifact. In many embodiments, the user input can be received via any pointing device including (but not limited to) a touch screen user interface, a mouse, a trackpad, and/or by gaze detection/eye tracking. In other embodiments, any of a variety of techniques for reviewing user input can be utilized as appropriate to the requirements of specific applications in accordance with embodiments of the invention.

To refine the locations of individual pixels, which can be especially useful for inaccurate pointing methods, and to assist with the artifact correction, additional pixels in the neighborhood of the selected pixel(s) are identified (512). The size of the neighborhood may be predetermined. In several embodiments, the neighborhood is square (N×N), rectangular (M×N), and/or has an arbitrary shape within a window. In various embodiments, the size of the neighborhood is fixed (generally as a small window such as, but not limited to, 3×3 or 5×5 pixels). In several embodiments, the size of the neighborhood is a single pixel.

In a number of embodiments, the neighborhood size is adaptive based on the local content around the pixels identified (510) by the user. In certain embodiments, the window is defined to be adaptive using a variety of techniques appropriate to the requirements of specific applications including (but not limited) to defining a window based upon a bilateral support in which the degree of pixel similarity is used to determine the shape of the neighborhood. In many embodiments, the size of the neighborhood can be determined based upon the (accuracy of) the pointing device or input modality used to identify (510) the pixels that form part of the artifact. In some embodiments, when the individual pixels selected (510) by the user are suspected to be localized within occlusion areas and the size of the occlusion areas can be reliably estimated based upon depth and/or occlusion information (and possibly associated confidence metrics), the size of the neighborhood is initially determined by the estimated size of the occlusion area in pixels. In a number of embodiments, confidence information concerning the depth estimates can be utilized to refine the neighborhood by including all pixels with low confidence depth estimates within the neighborhood of the selected pixels.

The selected (512) region or neighborhood can be (optionally) validated by providing visual feedback to the user indicating the selected region of the light field image. In many embodiments, the user is permitted to grow and/or shrink (516) the selected region via additional user inputs prior to the final selection. In several embodiments, region growing/shrinking is enabled automatically and the selection is based upon an initial small window (such as a 3×3 neighborhood), and the region is grown interactively with adaptive support while the user maintains the selection.

Although specific processes for selecting regions containing artifacts are disclosed above with respect to FIG. 5, any of a variety of processes can be utilized to enable user selection of a region of a light field image as appropriate to the requirements of specific applications in accordance with embodiments of the invention. A precise definition of the region containing an artifact can be beneficial in terms of highlighting as many of the pixels responsible for the artifact as possible, while avoiding the selection of pixels having correct initial depth estimates and/or visibility information. As is described further below, correction processes can then be applied to the pixels in the selected region to select depth estimates and/or visibility information that reduce the number of pixels that contribute to the creation of an artifact. The process of re-rendering the image can, however, impact regions of the light field image beyond simply the pixels in the selected region. Accordingly, processes for re-rendering a light field image in accordance with many embodiments of the invention re-render a portion of the light field image that is larger than the selected region. In many embodiments, the portion of the light field image that is re-rendered is predetermined (e.g. a given window, or the entire light field image). In a number of embodiments, the portion of the light field image that is re-rendered is determined based upon the disparity shifts that are likely to be applied to the pixels within the selected region during the re-rendering process based upon the updated depth estimates. In other embodiments, any of a variety of processes can be utilized to select the size of the portion of the light field image to re-render during the correction of an artifact as appropriate to the requirements of a specific application in accordance with embodiments of the invention. Processes for updating depth estimates and/or visibility information for pixels within a selected region in accordance with embodiments of the invention are discussed further below.

Updating Depth Estimates and Visibility Information

A variety of techniques can be utilized to determine the manner in which to update the depth estimates and/or visibility information for pixels that contribute to an artifact in a light field image in accordance with embodiments of the invention. In many embodiments, depth and/or visibility information can be provided directly by a user via an input mechanism enabling the identification of an object having the same depth and/or that is likely to exhibit the same visibility pattern in the captured image data. In other embodiments, the user can provide depth information directly using a user interface input mechanism including (but not limited to) a slider that allows selection of the correct depth from all possible depths. In several embodiments, image portions re-rendered using a variety of predetermined depth estimates and/or visibility patterns are presented to the user and the user selects the combination that results in the greatest reduction in the impact of the artifact. In many embodiments, the number of depths is extremely large and the process of selecting the correct depth can be performed using a hierarchy of selections from coarse to fine depth. In a number of embodiments, the depth is indicated through a measuring device or input directly using any available input method.

Figure 6:
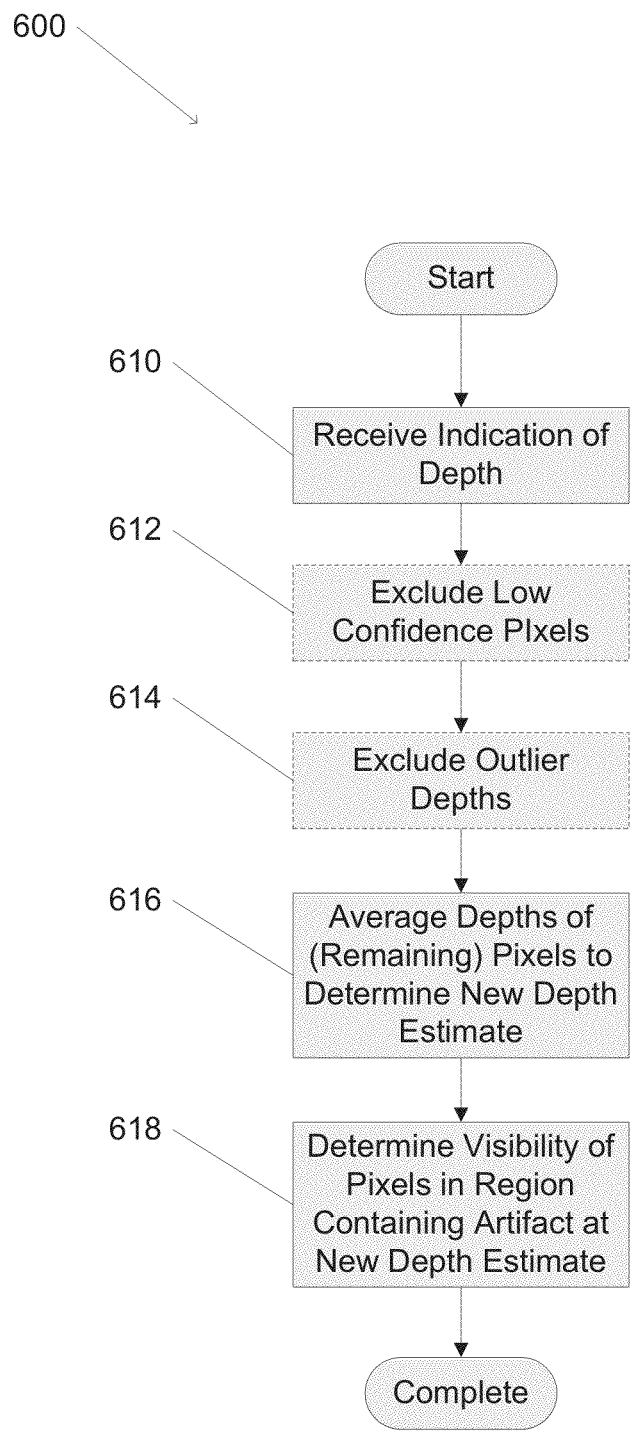
FIG. 6 is a flow chart illustrating a process for assigning an updated depth estimate and/or visibility to pixels in a region of a light field image containing an artifact in accordance with an embodiment of the invention.

A process for automatically determining depths to apply to pixels contributing to an artifact within a selected region of a light field image based upon depth information provided via a user selection of a region of the image in accordance with an embodiment of the invention is illustrated in FIG. 6. In a number of embodiments, the process 600 prompts a user to point to an area within the light field image of similar (or the same) depth as the area containing the artifact. An indication of a depth to be applied to pixels contributing to an artifact within a selected region of a light field image is received (610) via a user input such as (but not limited to) selection of another region of the image. Any of the processes for selecting and/or validating the selection of a region of pixels including those described above with reference to FIG. 5 can be utilized as appropriate to the requirements of specific applications in accordance with embodiments of the invention. Once a region is selected, the depth of the selected region can then be determined.

In a number of embodiments, depth is determined by averaging the depths of pixels within the selected region. Prior to averaging, the depths of pixels within the selected region can be filtered based upon factors including the confidence of the depth estimates (612), and/or whether a given depth estimate is an outlier (614) relative to other pixels within the selected region. When the filtering processes (if any) are complete, the remaining pixels can be averaged (616) to provide a depth estimate that can be applied to the pixels within the region of the light field image containing the artifact. If no pixels remain within the selected region following filtering, then the selected region can be determined to be too unreliable to utilize as the basis of a depth estimate and the user can be prompted to select another region and/or an alternative process can be utilized to obtain a depth estimate for the region containing the identified artifact.

Once a new depth estimate has been obtained, processes such as (but not limited to) those disclosed in U.S. patent application Ser. No. 13/972,881 can be utilized to determine (618) the visibility of image data utilized to synthesize the region of the image containing the artifact identified by the user. A portion of the light field image containing the artifact can then be rendered using the updated depth estimates and visibility information in the manner outlined above. In many embodiments, a number of different renderings based upon image data captured by different subsets of cameras that each correspond to a different pattern of visibility within the scene can be generated and the visibility of image data within the light field can be determined based upon a user selection of one of the renderings.

In many embodiments, the subsets of cameras utilized to select the image data for each of the renderings is determined to correspond to specific patterns of visibility that occur within natural scenes. The clusters or groupings of cameras utilized to detect particular patterns of visibility within a scene can depend upon the numbers of cameras in an array camera, the camera that is selected as the reference camera, and/or the distribution of cameras from different color channels within the array. Eight groups of cameras in a 5×5 array corresponding to different patterns of visibility that are likely to be present within a scene with respect to pixels in a reference camera located at the center of the array are shown in FIGS. 7A-7H. The eight groups are generated by rotating and flipping the same group template, which includes 12 cameras. Depending upon the orientation of the group template, this includes seven Green cameras, and either three Red cameras and 2 Blue cameras, or 3 Blue cameras and 2 Red cameras.

Although specific groups are shown in FIGS. 7A-7H for selecting groups of cameras, any of a variety of templates corresponding to common visibility patterns within a scene can be utilized to select pixels from a captured light field with which to re-render a portion of a light field image containing an artifact. In many embodiments the groups are selected so that the same number of cameras in the color channel containing the reference camera appears in each group of cameras. In addition, the groups can be determined so that there are at least two cameras in the other color channels in each group of cameras. In several embodiments, the groups of cameras are selected so that the central angle of the sector defined by the epipolar lines of each group is the same. In a number of embodiments, four groups of cameras are used with respect to a 5×5 array of cameras and each group of cameras contains nine cameras. In several embodiments, the nine cameras form a triangle of cameras with side lengths equal to 3 cameras, 3 cameras and 5 cameras. In many embodiments, the four groups of nine cameras form a 3×3 grid of cameras in each quadrant of the array.

In smaller array cameras, such as (but not limited to) 4×4 array cameras, and depending upon the pattern of color filters utilized within the array, it may not be possible to select groups of cameras that contain the same number of cameras in each color channel. In several embodiments, a color filter pattern is utilized so that groups of cameras corresponding to common visibility patterns contain the same number of cameras in a single color channel. In this way, image data captured within the color channel can be utilized to estimate depths for occluded or otherwise mismatched pixels by comparing the filtered costs of depth estimates obtained using the different subgroups. Four groups of cameras in a 4×4 array corresponding to different patterns of visibility that are likely to be present within a scene with respect to pixels in a reference camera located at the center of the array are shown in FIGS. 7I-7L. The four groups are generated by rotating and flipping the same group template, which includes 4 cameras. In the illustrated embodiment, there are three color channels: Red, Green, and Blue. Each group of cameras includes three Green cameras and one Blue or Red camera. Due to the presence of a single Red or Blue camera, in several embodiments depth estimates are determined using the image data captured in the Green color channel. The pixel value in the pixel location in the Red or Blue image corresponding to the pixel location (x, y) in the image from the reference viewpoint can be utilized as a reference pixel for the purpose of calculating the visibility of corresponding pixels in other images within the Red or Blue color channels. For each of the groups shown in FIGS. 7I-7L, one of the spectral channels is excluded from the group. The use of a π filter group can, however, be utilized to identify which of the images in the excluded color channel should be used as a reference image for the purpose of determining the visibility of pixels in the excluded color channel. When the viewpoint of a central camera of a π camera group is utilized as a reference viewpoint, two images in the excluded color channel will have been captured from viewpoints on opposite sides of the reference viewpoint. In typical natural scenes, a pixel location within an image from the reference viewpoint is likely to be visible in at least one of images captured by the adjacent cameras in the excluded color channel. In order to determine which (if any) of the images is most likely to contain a corresponding pixel to a pixel location in an image from the reference viewpoint that is visible, the similarity of the corresponding pixels within the two subgroups that contain the two images can be compared. Assuming that the corresponding pixels in at least one of the subgroups achieves a threshold level of similarity, then the image in the subgroup in which the corresponding pixels have the highest level of similarity can be selected as a reference image for the excluded color channel. In this way, the visibility of corresponding pixels in any image within the excluded color channel can be determined based upon its similarity with the corresponding pixel from the reference image for the excluded color channel. Where neither image captured from the adjacent viewpoints to the reference viewpoint reliably contain a visible pixel corresponding to a pixel location within an image from the reference viewpoint, then alternative techniques can be utilized to identify an image within the excluded color channel that contains a corresponding pixel that is visible and/or to determine the visibility of pixels within individual images from the excluded color channel. In several embodiments, visibility can be determined by performing epipolar line searches in the manner described herein. In a number of embodiments, cross-channel similarity measures can be used to determine a corresponding pixel within the images in an excluded color channel that can be utilized as a reference pixel. In several embodiments, the image in which the neighborhood surrounding the corresponding pixel exhibits the highest cross-correlation (or any other appropriate cross-channel similarity measure) with the reference image can be utilized as a reference pixel for the purpose of determining the visibility of the other corresponding pixels in the images in the excluded color channel. In several embodiments, competing image portions can be rendered by determining visibility using each of the two cameras from the excluded color channel that are adjacent the reference camera so that a user can select the rendered image portion in which the greatest reduction in the artifact is achieved. A similar approach can be taken with array cameras including different sized camera arrays.

Although specific processes for estimating depth and visibility are discussed with reference to FIG. 6, any of a variety of processes can be utilized to estimate depth and/or visibility of pixels within a region containing an artifact identified by a user in accordance with an embodiment of the invention. In many embodiments, the process analyzes the image data to determine one or more depth estimates and/or visibility patterns to evaluate. The evaluation can be automated and/or based upon user feedback.

In several embodiments, an exhaustive or semi-exhaustive search of all possible depths is performed for the selected region containing the artifact. In some embodiments, the depth is automatically determined by the means of probing all possible depths in combination with all possible visibility patterns. A semi-exhaustive search is a variant in which some combinations of depths and visibility, which are less likely or not useful in reducing artifacts in the final rendered images are excluded from the search. In several embodiments, the results of a parallax search that gives the best overall match for the pixels in the region of the light field image containing the selected artifact is automatically selected as the updated depth estimate and/or visibility information for the pixels within the region of the image containing the artifact.

In many embodiments, the search is only performed exhaustively on depth, and the camera visibility pattern is computed automatically based upon the updated depth estimate in the manner described above with reference to FIG. 6. In other embodiments, any of a variety of automated techniques can be utilized to select depth and/or visibility for pixels in a selected region containing an identified artifact including techniques that leverage human intelligence tasks to guide the search for the depth and/or visibility to achieve the greatest reduction in the artifact. An example of the correction of a user identified artifact in a light field image using a correction process in accordance with an embodiment of the invention is discussed further below.

Reduction of Artifacts in a Light Field Image

Figure 8A:
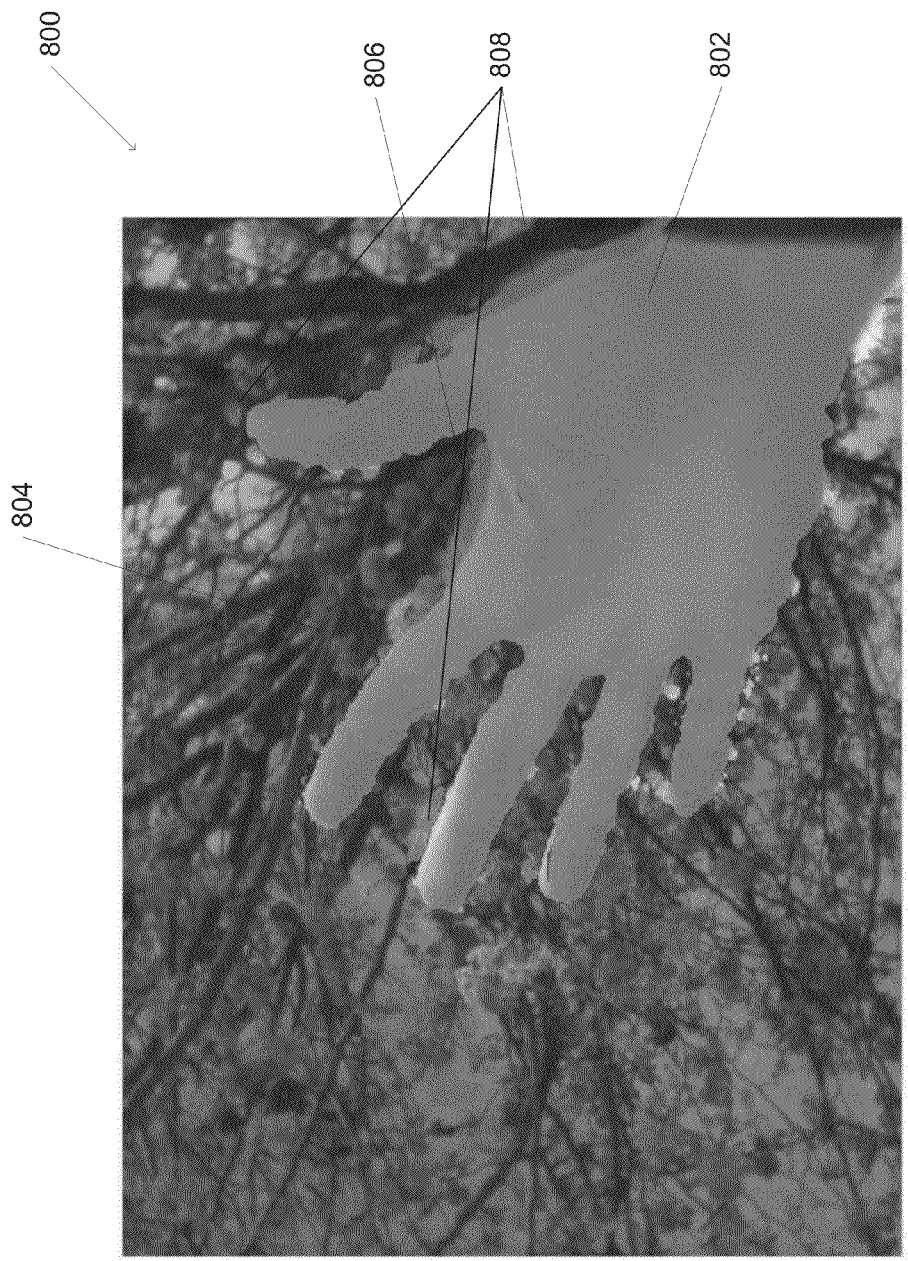
FIG. 8A is a rendered light field image containing depth related artifacts, where the rendered image is enhanced to highlight the depth related artifacts.
Figure 8B:
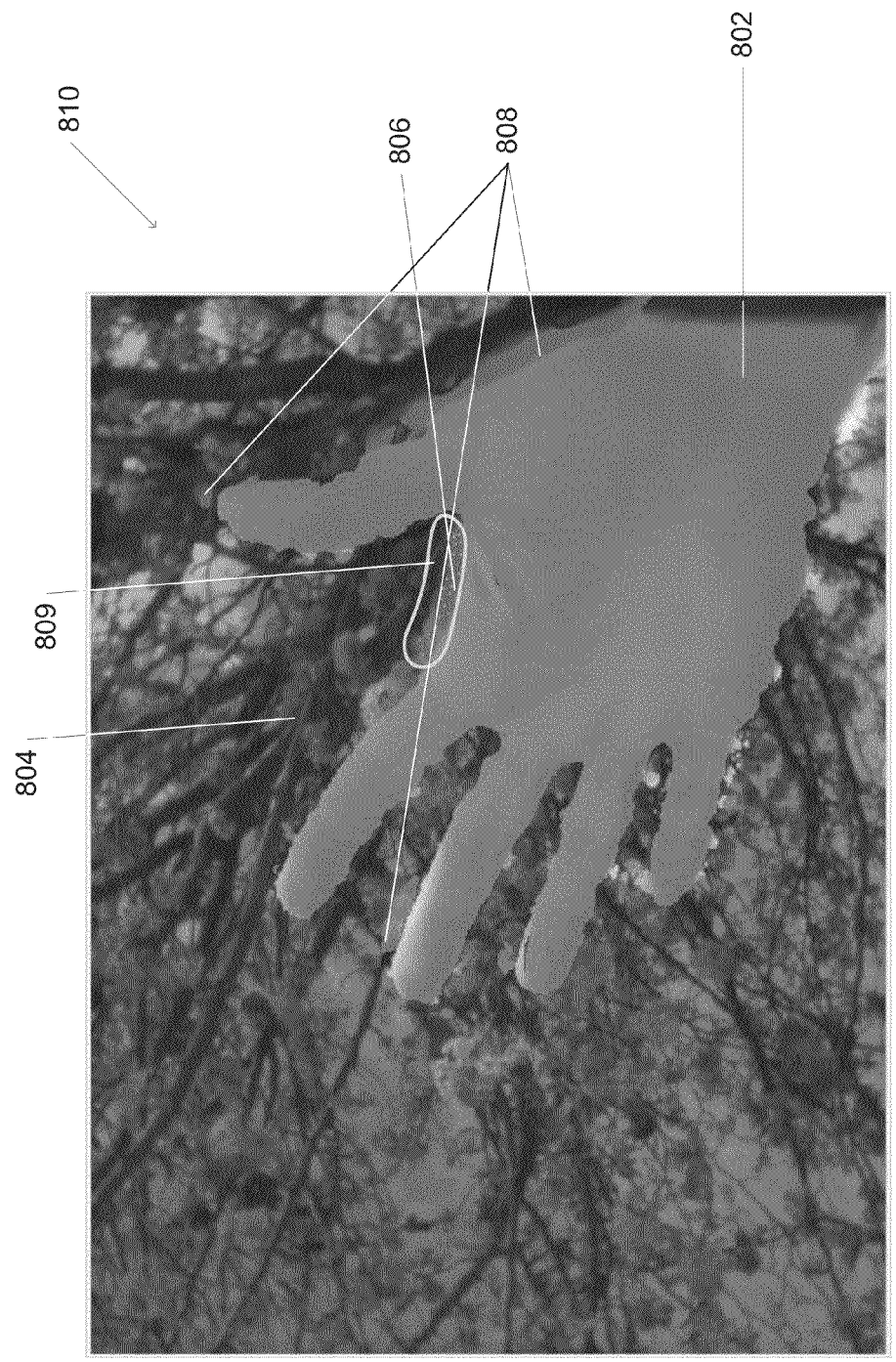
FIG. 8B conceptually illustrates the selection of a region within the light field image shown in FIG. 8A containing a depth related artifact in accordance with an embodiment of the invention.
Figure 8C:
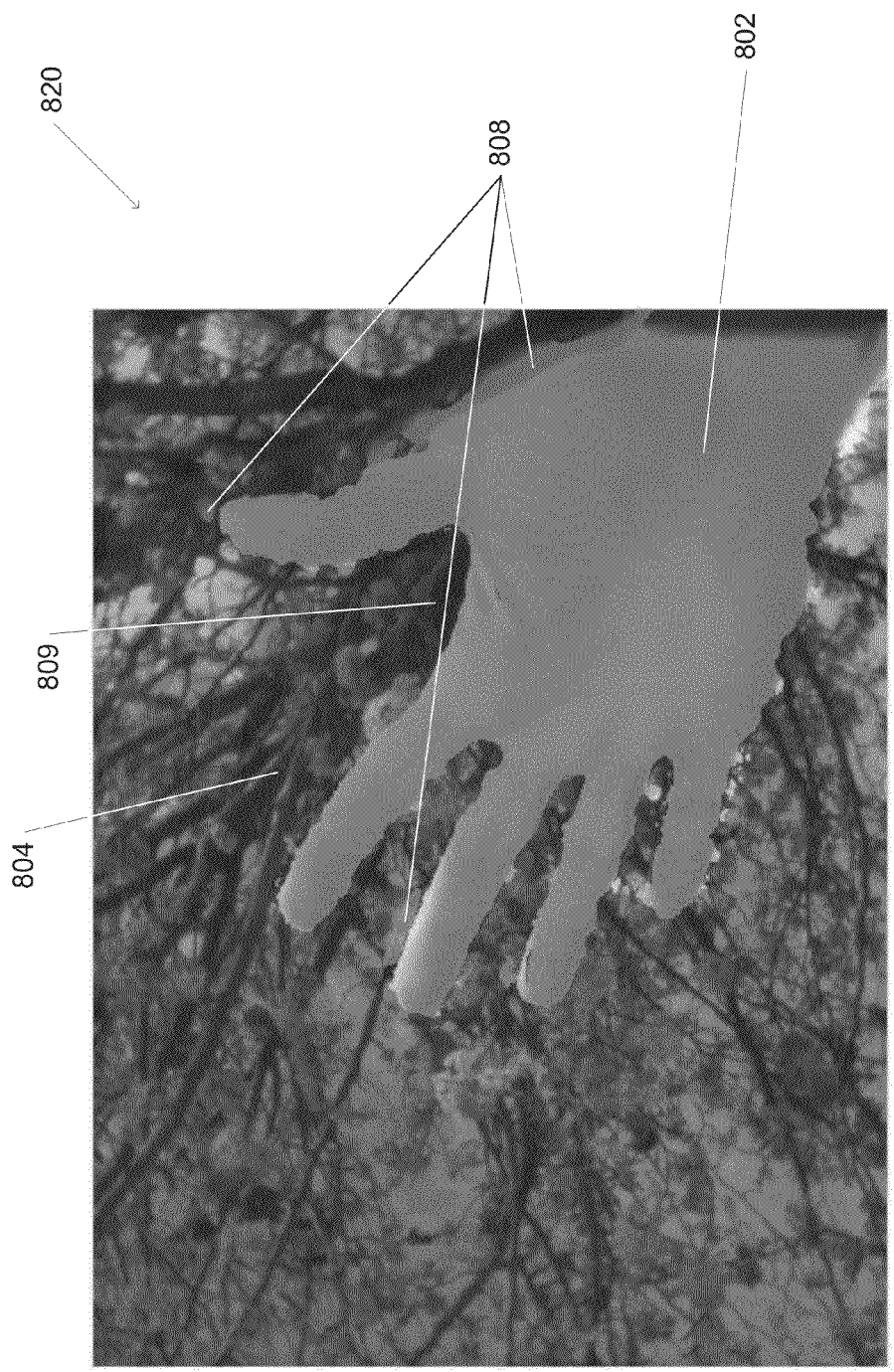
FIG. 8C is a re-rendering of the light field image shown in FIG. 8A using updated depth and/or visibility information for pixels within the selected region shown in FIG. 8B to correct the artifact present within the selected region in accordance with an embodiment of the invention.

An example of a light field image containing artifacts and a correction of one of the artifacts utilizing a process similar to those outlined above in accordance with an embodiment of the invention is illustrated in FIGS. 8A, 8B, and 8C. FIG. 8A illustrates a light field image 800 including a hand 802, a background 804, a first artifact 806, and a plurality of secondary artifacts 808. A user can identify any of the first 806 and the secondary 808 artifacts using any of a variety of input techniques. Turning now to FIG. 8B, an area 809 surrounding the first artifact 806 has been selected using a process similar those described above. In FIG. 8C, the pixels within the selected area 809 have had new depths assigned to them and a portion of the light field image containing the selected area 809 has been re-rendered. As a result of the re-rendering, the first artifact 806 has been virtually eliminated. Instead, the background 804 is visible in the region previously occupied by the first artifact 806. Although a specific example of correcting an artifact in a light field image is illustrated in FIGS. 8A, 8B, and 8C, similar processes can be utilized to correct artifacts in any of a variety of light field images synthesized using super-resolution processes based upon image data captured from multiple viewpoints in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for correcting artifacts in a light field image rendered from a light field obtained by capturing a set of images from different viewpoints and initial depth estimates for pixels within the light field using a processor configured by an image processing application and comprising:
    receiving a user input indicating the location of an artifact within said light field image;
    selecting a region of the light field image containing the indicated artifact;
    generating updated depth estimates for pixels within the selected region by:
        receiving a user input indicating a specific depth; and
        determining updated depth estimates for pixels in the selected region of said light field image containing said artifact based upon said specific depth by updating the depth estimate of a given pixel within the selected region containing said artifact with said specific depth when the given pixel is associated with a confidence value that satisfies a threshold;
    and
    re-rendering at least a portion of the light field image using the updated depth estimates for the pixels within the selected region.

2. The method of claim 1, wherein the rendering of the light field image utilizes initial visibility information with respect to pixels in the light field and the method further comprises:
    generating updated visibility information for pixels within the selected region;
    wherein re-rendering at least a portion of the light field image further comprises using the updated visibility information for the pixels within the selected region.

3. The method of claim 2, further comprising:
    receiving a user input validating the re-rendering of the at least a portion of the light field image; and
    updating the light field image, the initial depth estimates, and the initial visibility information.

4. The method of claim 1, wherein the set of images includes images captured in a plurality of color channels.

5. The method of claim 1, wherein the light field image is rendered from the light field and the depth estimates using a super-resolution process.

6. The method of claim 1, wherein receiving a user input indicating the location of an artifact within said light field image comprises receiving a user selection of at least one pixel in said light field image.

7. The method of claim 6, wherein selecting a region of the light field image containing the indicated artifact further comprises identifying additional pixels within the neighborhood of the at least one selected pixel in said light field image.

8. The method of claim 7, wherein identifying additional pixels further comprises identifying pixels within a predetermined neighborhood surrounding each of the at least one selected pixel in said light field image.

9. The method of claim 7, wherein identifying additional pixels further comprises identifying pixels within a neighborhood surrounding each of the at least one selected pixel in said light field image that adapts based upon the local characteristics of the pixels in the neighborhood of the at least one selected pixel.

10. The method of claim 1, wherein the rendering of the light field image utilizes initial visibility information with respect to pixels in the light field and the method further comprises:
generating updated visibility information for pixels within the selected region by:
re-rendering a portion of said light field image multiple times by applying different visibility information to the light field; and
determining updated visibility information for pixels in the selected region of said light field image containing said artifact based upon receipt of a user input selecting one of said multiple renderings of said portion of said light field image.

11. The method of claim 1, wherein the rendering of the light field image utilizes initial visibility information with respect to pixels in the light field and the method further comprises:
generating updated depth estimates and visibility information for pixels within the selected region by:
searching a plurality of combinations of depth and visibilities for pixels within the selected region of said light field image containing said artifact; and
selecting one of said plurality of combinations of depth and visibilities based upon the selection resulting in the best overall match between the pixels in the selected region of said light field image and corresponding pixels within the light field, where the corresponding pixels within the light field are identified based upon the selected depth and visibilities.

12. The method of claim 1, wherein re-rendering at least a portion of the light field image using the updated depth estimates for the pixels within the selected region further comprises using a super-resolution process to re-render said at least a portion of the light field image.

13. The method of claim 1, wherein re-rendering at least a portion of the light field image using the updated depth estimates for the pixels within the selected region further comprises shifting pixels within the selected region along epipolar lines based upon the updated depth estimates.

14. The method of claim 1, wherein:
receiving a user input indicating a specific depth comprises:
receiving a user input identifying of a region of said light field image that does not contain said artifact; and
indicating the specific depth by averaging the initial depths of pixels within the identified region that does not contain said artifact.

15. A method for correcting artifacts in a light field image rendered from a light field obtained by capturing a set of images from different viewpoints and initial depth estimates for pixels within the light field using a processor configured by an image processing application, the initial depth estimates including confidence metrics describing the reliability of the initial depth estimates, the method comprising:
receiving a user input indicating the location of an artifact within said light field image, the user input selecting at least one pixel in said light field image;
selecting a region of the light field image containing the indicated artifact;
identifying additional pixels within the neighborhood of the at least one selected pixel in said light field image, the additional pixels having depth estimates with associated confidence metrics, the additional pixels' confidence metrics satisfying a threshold;
generating updated depth estimates for pixels within the selected region; and
re-rendering at least a portion of the light field image using the updated depth estimates for the pixels within the selected region.

16. The method of claim 15, wherein generating updated depth estimates for pixels within the selected region further comprises:
receiving a user input identifying of a region of said light field image that does not contain said artifact; and
determining an updated depth estimate based upon the initial depth estimates of pixels within the identified region of said light field image.

17. The method of claim 16, wherein receiving a user input identifying a region of said light field image that does not contain said artifact further comprises receiving a user selection of at least one pixel in said light field image.

18. The method of claim 17, wherein receiving a user input identifying a region of said light field image that does not contain said artifact further comprises identifying additional pixels within the neighborhood of the at least one selected pixel in said light field image.

19. The method of claim 18, wherein identifying additional pixels further comprises identifying pixels within a predetermined neighborhood surrounding each of the at least one selected pixel in said light field image.

20. The method of claim 18, wherein identifying additional pixels further comprises identifying pixels within a neighborhood surrounding each of the at least one selected pixel in said light field image that adapts based upon the local characteristics of the pixels in the neighborhood of the at least one selected pixel.

21. The method of claim 15, wherein generating updated depth estimates further comprises:
iteratively re-rendering a portion of said light field image containing said artifact in response to received user inputs indicating a plurality of potential depths; and
determining updated depth estimates for pixels in the selected region of said light field image containing said artifact based upon receipt of a user input validating one of said plurality of potential depths.

22. A method for correcting artifacts in a light field image rendered from a light field obtained by capturing a set of images from different viewpoints and initial depth estimates for pixels within the light field using a processor configured by an image processing application and comprising:
receiving a user input indicating the location of an artifact within said light field image;
selecting a region of the light field image containing the indicated artifact;
generating updated depth estimates for pixels within the selected region by:
receiving a user input identifying of a region of said light field image that does not contain said artifact;
determining an updated depth estimate based upon the initial depth estimates of pixels within the identified region of said light field image that does not contain said artifact by averaging the initial depths of pixels within the identified region that does not contain said artifact; and updating the depth estimates of pixels within the selected region containing said artifact;

and re-rendering at least a portion of the light field image using the updated depth estimates for the pixels within the selected region.

23. The method of claim 22, wherein:

the initial depth estimates include confidence metrics describing the reliability of the initial depth estimates; and averaging the initial depths of pixels within the identified region further comprises filtering pixels from the averaging process that have depth estimates with confidence metrics that satisfy a threshold level of reliability.

24. The method of claim 22, wherein:

the confidence metrics comprise a set of confidence values associated with the depth information assigned to at least one pixel within the light field image; and updating the depth estimates of pixels within the selected region containing said artifact further comprises:

comparing the confidence value associated with a given pixel within the selected region containing said artifact to a second confidence value associated with at least one pixel in the identified region of the light field image that does not contain said artifact; and when the difference between the first and second confidence values satisfies a threshold, updating the depth estimate of the given pixel with said average depth estimate.

25. The method of claim 22, wherein averaging the initial depths of pixels within the identified region further comprises filtering pixels from the averaging process that are outliers relative to the other pixels within the identified region that does not contain said artifact.

26. An image processing system, comprising:

a processor; and memory containing an image processing application;

wherein the image processing application configures the processor to:

receive a user input indicating the location of an artifact within a light field image rendered from a light field obtained by capturing a set of images from different viewpoints and initial depth estimates for pixels within the light field;

select a region of the light field image containing an indicated artifact;

generate updated depth estimates for pixels within a selected region by:

receiving a user input indicating a specific depth; and determining updated depth estimates for pixels in the selected region of said light field image containing said artifact based upon said specific depth by updating the depth estimate of a given pixel within the selected region containing said artifact with said specific depth when the given pixel is associated with a confidence value that satisfies a threshold; and re-render at least a portion of a light field image using the updated depth estimates for the pixels within the selected region.

27. The image processing system of claim 26, further comprising:

an array camera module;

wherein the image processing application configures the processor to:

capture a set of images from different viewpoints;

generate initial depth estimates based upon the disparity between corresponding pixels in a captured set of images;

render a light field image using a super-resolution process based upon a set of images and initial depth estimates; and store a rendered light field image in said memory.

28. The image processing system of claim 26, wherein:

receiving a user input indicating a specific depth comprises:

receiving a user input identifying of a region of said light field image that does not contain said artifact; and indicating the specific depth by averaging the initial depths of pixels within the identified region that does not contain said artifact.

* * * * *